United States Patent
Luo et al.

(10) Patent No.: US 12,185,095 B2
(45) Date of Patent: Dec. 31, 2024

(54) RELAY COMMUNICATIONS METHOD AND APPARATUS

(71) Applicant: HUAWEI TECHNOLOGIES CO., LTD., Guangdong (CN)

(72) Inventors: Haiyan Luo, Shenzhen (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 446 days.

(21) Appl. No.: 17/400,780

(22) Filed: Aug. 12, 2021

(65) Prior Publication Data

US 2021/0377834 A1 Dec. 2, 2021

Related U.S. Application Data

(63) Continuation of application No. PCT/CN2020/075349, filed on Feb. 14, 2020.

(30) Foreign Application Priority Data

Feb. 15, 2019 (CN) .......................... 201910117716.2

(51) Int. Cl.
*H04W 36/00* (2009.01)
*H04W 88/04* (2009.01)

(52) U.S. Cl.
CPC ....... *H04W 36/0016* (2013.01); *H04W 88/04* (2013.01); *H04W 36/033* (2023.05)

(58) Field of Classification Search
None
See application file for complete search history.

(56) References Cited

U.S. PATENT DOCUMENTS

| 2018/0110001 A1* | 4/2018 | Yasukawa | H04W 52/0219 |
| 2018/0139667 A1* | 5/2018 | Yu | H04W 76/23 |
| 2018/0167986 A1* | 6/2018 | Lin | H04W 8/26 |
| 2018/0343556 A1* | 11/2018 | Wang | H04W 40/00 |

(Continued)

FOREIGN PATENT DOCUMENTS

| CN | 101938798 A | 1/2011 |
| CN | 102215537 A | 10/2011 |
| CN | 105246027 A | 1/2016 |

(Continued)

OTHER PUBLICATIONS

EPO Communication pursuant to Rule 164(1) EPC issued in European Application No. 20756650.6 on Feb. 3, 2022, 13 pages.

(Continued)

*Primary Examiner* — Srinivasa R Reddivalam
(74) *Attorney, Agent, or Firm* — Fish & Richardson P.C.

(57) ABSTRACT

This application provides example relay communications methods and apparatuses. A first terminal device can receive, from a second terminal device, indication information used to indicate the second terminal device to stop providing a first relay service between the first terminal device and a radio access network device. The first terminal device can then send notification information to the radio access network device through a third terminal device, to notify the radio access network device that the first terminal device accesses the radio access network device by using a second relay service of the third terminal device.

6 Claims, 10 Drawing Sheets

(56) References Cited

U.S. PATENT DOCUMENTS

2021/0289401 A1* 9/2021 Xu .................. H04W 36/0009

FOREIGN PATENT DOCUMENTS

| CN | 106376025 A | 2/2017 |
| CN | 107710862 A | 2/2018 |
| CN | 107889080 A | 4/2018 |
| CN | 108024295 A | 5/2018 |
| CN | 108810854 A | 11/2018 |
| EP | 3273745 A1 | 1/2018 |
| EP | 3370473 A1 | 9/2018 |
| WO | 2017014716 A1 | 1/2017 |
| WO | 2018006253 A1 | 1/2018 |
| WO | 2018059126 A1 | 4/2018 |

OTHER PUBLICATIONS

Fujitsu Limited, "Discussion on trigger condition for relay reselection," 3GPP TSG-RAN WG2 Meeting#91bis, R2-154307, Oct. 5-9, 2015, Malmo, Sweden, 2 pages.
Kyocera, "Consideration of establishment of ProSe UE-to-Network Relays," 3GPP TSG-RAN WG2 #90, R2-152600, Fukuoka, Japan, May 25-29, 2015, 6 pages.
Office Action issued in Chinese Application No. 201910117716.2 on Jan. 6, 2021, 20 pages (with English translation).
PCT International Search Report and Written Opinion issued in International Application No. PCT/CN2020/075349 on Apr. 28, 2020, 15 pages (with English translation).
Office Action issued in Chinese Application No. 201910117716.2 on Apr. 6, 2022, 8 pages.

* cited by examiner

RELAY COMMUNICATIONS METHOD AND APPARATUS

CROSS-REFERENCE TO RELATED APPLICATIONS

This application is a continuation of International Application No. PCT/CN2020/075349, filed on Feb. 14, 2020, which claims priority to Chinese Patent Application No. 201910117716.2, filed on Feb. 15, 2019. The aforementioned disclosures are hereby incorporated by reference in their entireties.

TECHNICAL FIELD

This application relates to the communications field, and more specifically, to a relay communications method and apparatus.

BACKGROUND

In the 3rd generation partnership project (3GPP) standard, cell handover of a first terminal device is mainly performed through control of a radio resource control (RRC) message of an access network device. Specifically, when the first terminal device moves, the first terminal device sends signal quality of a target cell detected by the first terminal device to a radio access network device, and the radio access network device determines, based on the signal quality of the target cell and other factors, whether the cell handover needs to be performed. When the handover needs to be performed, the radio access network device sends an RRC message to the first terminal device, where the RRC message may carry an identifier of the target cell to which the first terminal device is to be handed over.

In a scenario in which the first terminal device communicates with the radio access network device by using another terminal device as a relay device, as the first terminal device moves, the radio access network device may send an RRC message to the first terminal device through the another terminal device, to indicate a target relay device to be switched to. Herein, it is assumed that a second terminal device is a terminal device that currently provides a relay service between the first terminal device and the radio access network device, and a third terminal device is a potential terminal device that provides a relay service between the first terminal device and the radio access network device. If the first terminal device suddenly moves from coverage of the second terminal device to coverage of the third terminal device, or signal quality between the second terminal device and the radio access network device deteriorates, or even a radio link failure occurs between the second terminal device and the radio access network device, the first terminal device may not receive the RRC message sent by the radio access network device through the second terminal device, and relay device switching is not performed. Consequently, communication between the first terminal device and the radio access network device is interrupted or communication efficiency is reduced.

SUMMARY

This application provides a data communications method and apparatus, to improve data communication efficiency.

According to a first aspect, a relay communications method is provided, where the method includes: A first terminal device receives indication information from a second terminal device, where the indication information is used to indicate to stop providing a relay service between the first terminal device and a radio access network device. The first terminal device sends notification information to the radio access network device by using a relay service of a third terminal device, where the notification information indicates the first terminal device to connect to the radio access network device through the third terminal device.

The first terminal device receives, from the second terminal device, the indication information that indicates the second terminal device to stop providing the relay service for the first terminal device and the radio access network device, and sends the notification information to the radio access network device through the third terminal device to notify the radio access network device that the first terminal device is connected to the radio access network device by using the relay service of the third terminal device. In this way, the radio access network device may communicate with the first terminal device through the third terminal device. This avoids communication interruption between the first terminal device and the radio access network device when the first terminal device suddenly discovers that the second terminal device cannot perform relay. Therefore, communication efficiency is improved.

In some possible implementations, the indication information indicates that signal quality between the second terminal device and the radio access network device is less than or equal to a preset quality threshold.

The indication information may indirectly indicate the second terminal device to stop providing the relay service between the first terminal device and the radio access network device by using the signal quality between the second terminal device and the radio access network device less than or equal to the preset quality threshold. This embodiment of this application provides an indication manner, to increase indication flexibility.

In some possible implementations, the indication information indicates that a radio link failure occurs between the second terminal device and the radio access network device.

The indication information may indirectly indicate, by using the radio link failure between the second terminal device and the radio access network device, the second terminal device to stop providing the relay service between the first terminal device and the radio access network device. This embodiment of this application provides another indication manner, to increase indication flexibility.

In some possible implementations, the indication information further indicates an identifier of the third terminal device, and the method further includes: The first terminal device determines the third terminal device based on the identifier of the third terminal device.

The indication information may further indicate the identifier of the third terminal device. In this way, the first terminal device may determine a terminal device (namely, the third terminal device) that can currently perform a relay service for the first terminal device and the radio access network device. Further, the first terminal device sends the notification information to the radio access network device through the third terminal device, so that the radio access network device can communicate with the first terminal device through the third terminal device. This avoids communication interruption between the first terminal device and the radio access network device when the first terminal device suddenly discovers that the second terminal device cannot perform relay. Therefore, communication efficiency is improved.

In some possible implementations, the notification information further indicates an identifier of the first terminal device.

The notification information may further indicate the identifier of the first terminal device, so that the radio access network device may learn, based on the identifier, that switching is performed between relay devices of a first terminal device corresponding to the identifier. In this way, when a plurality of first terminal devices perform relay switching, the radio access network device can accurately learn of a specific first terminal device that sends the notification information. When communicating with the first terminal device, the radio access network device can use the relay device that is after switching, thereby improving communication efficiency.

In some possible implementations, the method further includes: The first terminal device sends the identifier of the third terminal device to the second terminal device.

When determining that the third terminal device is a device that currently relays the first terminal device and the radio access network device, the first terminal device may further send the identifier of the third terminal device to the second terminal device. When data of the first terminal device is not completely forwarded, the data is forwarded through the third terminal device, so that data loss of the first terminal device is avoided, and the signal quality is improved.

According to a second aspect, a relay communications method is provided, where the method includes: A second terminal device generates indication information, where the indication information is used to indicate to stop providing a relay service between a first terminal device and a radio access network device. The second terminal device sends the indication information to the first terminal device.

The second terminal device generates the indication information that indicates the second terminal device to stop providing the relay service for the first terminal device and the radio access network device, and sends the indication information to a third terminal device, so that the third terminal device sends notification information to the radio access network device based on the indication information to notify the radio access network device that the first terminal device accesses the radio access network device through the third terminal device. In this way, the radio access network device may communicate with the first terminal device through the third terminal device. This avoids communication interruption between the first terminal device and the radio access network device when the first terminal device suddenly discovers that the second terminal device cannot perform relay. Therefore, communication efficiency is improved.

In some possible implementations, the indication information indicates that signal quality between the second terminal device and the radio access network device is less than a preset threshold.

The indication information may indirectly indicate the second terminal device to stop providing the relay service between the first terminal device and the radio access network device by using the signal quality between the second terminal device and the radio access network device less than or equal to the preset quality threshold. This embodiment of this application provides an indication manner, to increase indication flexibility.

In some possible implementations, the indication information indicates that a radio link failure occurs between the second terminal device and the radio access network device.

The indication information may indirectly indicate, by using the radio link failure between the second terminal device and the radio access network device, the second terminal device to stop providing the relay service between the first terminal device and the radio access network device. This embodiment of this application provides another indication manner, to increase indication flexibility.

In some possible implementations, the method further includes: The second terminal device sends to-be-sent data of the first terminal device to the third terminal device, where the third terminal device is a device that currently provides a relay service for the first terminal device and the radio access network device; and the second terminal device is a device that previously provides a relay service for the first terminal device and the radio access network device.

The second terminal device sends the to-be-sent data of the first terminal device to the third terminal device. In this way, when the data of the first terminal device is not completely forwarded, the data is forwarded through the third terminal device, so that data loss of the first terminal device is avoided, and the signal quality is improved.

In some possible implementations, that the second terminal device sends to-be-sent data of the first terminal device to the third terminal device includes: The second terminal device sends a first message, where the first message includes the to-be-sent data. The first message further includes an identifier of the first terminal device, an identifier of a first path, and transmission direction indication information, and the first path is used for communication between the first terminal device and the radio access network device.

The second terminal device may carry the data of the first terminal device by using a first message, and the first message may further carry the identifier of the first terminal device, the identifier of the first path, and the transmission direction indication information. In this way, the third terminal device may learn that the data carried in the first message is the data of the first terminal device, learn of a path identifier of the first path corresponding to the data of the first terminal device, and learn that the data of the first terminal device is data that needs to be transmitted in an uplink or data that needs to be transmitted in a downlink. In this way, the third terminal device can send the data of the first terminal device to a communication peer end in a proper path, thereby further improving communication efficiency.

According to a third aspect, a relay communications method is provided. The method is applied to a communications system including a first terminal device, a second terminal device, a third terminal device, and a radio access network device. The third terminal device is a device that currently provides a relay service for the first terminal device and the radio access network device, and the second terminal device is a device that provides a relay service for the first terminal device and the radio access network device before the third terminal device. The method includes: The second terminal device receives data of the first terminal device. The second terminal device sends a first message to the third terminal device, where the first message includes the data of the first terminal device and notification information, and the notification information is used to indicate an identifier of the first terminal device, a data radio bearer DRB identifier, and direction indication information. The DRB identifier is used to indicate a DRB that carries the data of the first terminal device and that is between the first terminal device and the radio access network device, and the direction indication information is used to indicate a transmission direction of the data of the first terminal device.

There may be a plurality of bearers for communication between the first terminal device and the radio access network device, and the bearer may be the DRB. The first message carries a bearer identifier corresponding to a piece of data (indicated as the data of the first terminal device in the following) of the first terminal device, the identifier of the first terminal device, and the direction indication information. The direction indication information may indicate whether the data of the first terminal device is uplink data or downlink data. In addition, the data of the first terminal device and the notification information may be carried in a same message (namely, the first message). In this way, after receiving the first message, the third terminal device may learn of a terminal device whose data is the data included in the first message and the DRB identifier corresponding to the data of the first terminal device, so that the third terminal device can accurately determine, based on the first message, a receive end to which the data of the first terminal device is sent (where for example, the uplink data is sent to the radio access network device, and the downlink data is sent to the first terminal device), and a path (to be specific, a path between the third terminal device and the radio access network device, or a path between the third terminal device and the first terminal device) to be used, to improve communication efficiency.

In some possible implementations, the notification information is carried in side link control information SCI, and a time domain resource occupied by the SCI is the same as a time domain resource of the data of the first terminal device, or the time domain resource occupied by the SCI is before the time domain resource occupied by the data of the first terminal device.

The notification information is carried by using the SCI, and a resource specifically used to transmit the notification information does not need to be configured, thereby reducing signaling overheads.

In some possible implementations, the notification information is carried in an adaptation layer of the first message.

According to a fourth aspect, a communications apparatus is provided. The apparatus may be an independent terminal device, or may be a chip in the terminal device. The apparatus has functions of implementing the first aspect and various possible implementations thereof. The functions may be implemented by hardware, or may be implemented by hardware executing corresponding software. The hardware or the software includes one or more modules corresponding to the foregoing functions.

In a possible design, the apparatus includes a receiving module and a sending module. The receiving module or the sending module may be, for example, at least one of a transceiver, a receiver, or a transmitter, or the receiving module or the sending module may include a radio frequency circuit or an antenna. The apparatus further includes a processing module, and the processing module may be a processor.

Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from another module, so that the apparatus performs the method according to any one of the first aspect or the possible implementations thereof.

In another possible design, when the apparatus is a chip, the chip includes a receiving module and a sending module. Optionally, the chip further includes a processing module.

The receiving module and the sending module may be, for example, an input/output interface, a pin, a circuit, or the like on the chip. The processing module may be, for example, a processor. The processing module may execute instructions, so that the chip in the terminal performs the communications method according to any one of the first aspect and the possible implementations thereof.

Optionally, the processing module may execute instructions in a storage module, and the storage module may be a storage module in the chip, for example, a register or a buffer. The storage module may alternatively be located inside a communications device but outside the chip, for example, a read-only memory (ROM) or another type of static storage device that can store static information and instructions, or a random access memory (RAM).

The processor mentioned above may be a general-purpose central processing unit (CPU), a microprocessor, an application-specific integrated circuit (ASIC), or one or more integrated circuits configured to control program execution of the communications method according to the foregoing aspects.

According to a fifth aspect, a communications apparatus is provided. The apparatus may be a terminal device or a chip in the terminal device. The apparatus has functions of implementing the second aspect and various possible implementations thereof. The functions may be implemented by hardware, or may be implemented by hardware executing corresponding software. The hardware or the software includes one or more modules corresponding to the foregoing functions.

In a possible design, the apparatus includes a processing module and a sending module. The sending module may be, for example, at least one of a transceiver or a transmitter, or the sending module may include a radio frequency circuit or an antenna. The processing module may be a processor.

Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from another module, so that the apparatus performs the communications method according to the second aspect and various possible implementations thereof. In this design, the apparatus may be a radio access network device.

In another possible design, when the apparatus is a chip, the chip includes a processing module and a sending module. The sending module may be, for example, an output interface, a pin, or a circuit on the chip. The processing module may be, for example, a processor. The processing module may execute instructions, so that the chip in the terminal performs the communications method according to any one of the second aspect and the possible implementations thereof.

Optionally, the processing module may execute instructions in a storage module, and the storage module may be a storage module in the chip, for example, a register or a buffer. The storage module may alternatively be located inside a communications device but outside the chip, for example, a read-only memory or another type of static storage device that can store static information and instructions, or a random access memory.

The processor mentioned above may be a general-purpose central processing unit, a microprocessor, an application-specific integrated circuit, or one or more integrated circuits configured to control execution of a program of the communications method in the foregoing aspects.

According to a sixth aspect, a communications apparatus is provided. The apparatus may be a terminal device or a chip in the terminal device. The apparatus has functions of implementing the third aspect and various possible implementations thereof. The functions may be implemented by hardware, or may be implemented by hardware executing corresponding software. The hardware or the software includes one or more modules corresponding to the foregoing functions.

In a possible design, the apparatus includes a receiving module and a sending module. The receiving module or the sending module may be, for example, at least one of a transceiver, a receiver, or a transmitter, or the receiving module or the sending module may include a radio frequency circuit or an antenna. The apparatus further includes a processing module, and the processing module may be a processor.

Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from another module, so that the apparatus performs the communications method according to the third aspect and various possible implementations thereof. In this design, the apparatus may be the terminal device.

In another possible design, when the apparatus is a chip, the chip includes a receiving module and a sending module. The receiving module and the sending module may be, for example, an input/output interface, a pin, a circuit, or the like on the chip. The processing module may be, for example, a processor. The processing module may execute instructions, so that the chip in the terminal performs the communications method according to any one of the third aspect and the possible implementations thereof.

Optionally, the processing module may execute instructions in a storage module, and the storage module may be a storage module in the chip, for example, a register or a buffer. The storage module may alternatively be located inside a communications device but outside the chip, for example, a read-only memory or another type of static storage device that can store static information and instructions, or a random access memory.

The processor mentioned above may be a general-purpose central processing unit, a microprocessor, an application-specific integrated circuit, or one or more integrated circuits configured to control execution of a program of the communications method in the foregoing aspects. According to a fifth aspect, a computer storage medium is provided. The computer storage medium stores program code, and the program code is used to indicate instructions for performing the method according to any one of the first aspect or the possible implementations thereof.

According to a seventh aspect, a computer storage medium is provided. The computer storage medium stores program code, and the program code is used to indicate instructions for performing the method according to any one of the first aspect or the possible implementations thereof.

According to an eighth aspect, a computer storage medium is provided. The computer storage medium stores program code, and the program code is used to indicate instructions for performing the method according to any one of the second aspect, the third aspect, or the possible implementations thereof.

According to a ninth aspect, a computer program product including instructions is provided. When the computer program product runs on a computer, the computer is enabled to perform the method according to any one of the first aspect or the possible implementations thereof.

According to a tenth aspect, a computer program product including instructions is provided. When the computer program product runs on a computer, the computer is enabled to perform the method according to any one of the second aspect, the third aspect, or the possible implementations thereof.

According to an eleventh aspect, a processor is provided. The processor is configured to be coupled to a memory, and is configured to perform the method according to any one of the first aspect or the possible implementations thereof.

According to a twelfth aspect, a processor is provided. The processor is configured to be coupled to a memory, and is configured to perform the method according to any one of the second aspect, the third aspect, or the possible implementations thereof.

According to a thirteenth aspect, a chip is provided. The chip includes a processor and a communications interface. The communications interface is configured to communicate with an external component or an internal component, and the processor is configured to implement the method according to any one of the first aspect or the possible implementations thereof.

Optionally, the chip may further include a memory. The memory stores instructions. The processor is configured to execute the instructions stored in the memory or instructions from another module. When the instructions are executed, the processor is configured to implement the method according to any one of the first aspect or the possible implementations thereof.

Optionally, the chip may be integrated into a terminal device.

According to a fourteenth aspect, a chip is provided. The chip includes a processor and a communications interface. The communications interface is configured to communicate with an external component or an internal component, and the processor is configured to implement the method according to any one of the second aspect, the third aspect, or the possible implementations thereof.

Optionally, the chip may further include a memory. The memory stores instructions. The processor is configured to execute the instructions stored in the memory or instructions from another module. When the instructions are executed, the processor is configured to implement the method according to any one of the second aspect, the third aspect, or the possible implementations thereof.

Optionally, the chip may be integrated into a terminal device.

Based on the foregoing technical solutions, the first terminal device receives, from the second terminal device, the indication information that indicates the second terminal device to stop providing the relay service for the first terminal device and the radio access network device, and sends the notification information to the radio access network device based on the indication information through the third terminal device to notify the radio access network device that the first terminal device accesses the radio access network device through the third terminal device. In this way, the radio access network device may communicate with the first terminal device through the third terminal device. This avoids communication interruption between the first terminal device and the radio access network device when the first terminal device suddenly discovers that the second terminal device cannot perform relay. Therefore, communication efficiency is improved.

DESCRIPTION OF EMBODIMENTS

Figure 1:
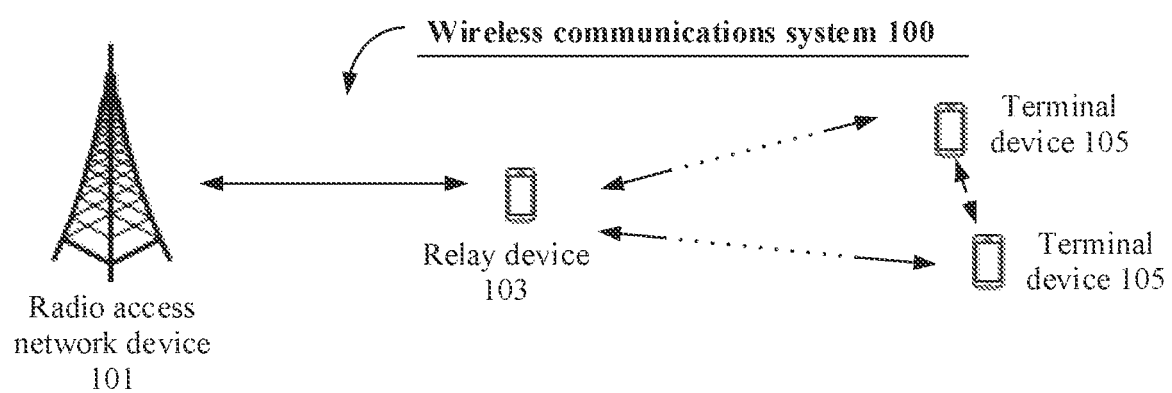
FIG. 1 is a schematic diagram of a communications system according to this application.

The technical solutions of embodiments of this application may be applied to various communications systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunications system (UMTS), a worldwide interoperability for microwave access (WiMAX) communications system, a future 5th generation (5G) system, or new radio (NR).

A first terminal device in the embodiments of this application may be user equipment, an access terminal device, a subscriber unit, a subscriber station, a mobile station, a mobile console, a remote station, a remote terminal device, a mobile device, a user terminal device, a terminal device, a wireless communications device, a user agent, a user apparatus, or the like. The first terminal device may alternatively be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a first terminal device in a future 5G network, a first terminal device in a future evolved public land mobile communications network (PLMN), or the like. This is not limited in the embodiments of this application. In addition, in the embodiments of this application, method steps performed by the terminal device may be specifically implemented by at least one chip in the terminal device.

A radio access network device in the embodiments of this application may be a device configured to communicate with the first terminal device. The radio access network device may be a base transceiver station (BTS) in a global system for mobile communications (GSM) system or code division multiple access (CDMA), a NodeB (NB) in a wideband code division multiple access (WCDMA) system, an evolved NodeB (eNB or eNodeB) in an LTE system, or a radio controller in a cloud radio access network (CRAN) scenario. Alternatively, the radio access network device may be a relay station, an access point, a vehicle-mounted device, a wearable device, a radio access network in a future 5G network, a radio access network in a future evolved PLMN network, or the like. This is not limited in the embodiments of this application.

In the embodiments of this application, the first terminal device or the radio access network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant communication software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be the first terminal device, the radio access network device, or a function module that is in the first terminal device or the radio access network device and that can invoke and execute the program.

It should be noted that in the embodiments of this application, a plurality of applications may be run at the application layer. In this case, an application for performing a relay communications method in the embodiments of this application may be different from an application configured to control a receive end device to implement an action corresponding to received data.

FIG. 1 is a schematic diagram of a communications system according to this application. In a wireless communications system 100, a relay device 103 may be configured to provide a relay service for the at least one first terminal device 105 and a radio access network device 101. There may be one or more relay devices 103. That is, a plurality of relay devices provide relay services for the first terminal device and the radio access network device. The relay device is a terminal type node, and the relay device communicates with the first terminal device by using a sidelink sidelink (which is also referred to as a PC5 interface).

It should be noted that the wireless communications system 100 shown in FIG. 1 is only intended to describe the technical solutions of this application more clearly, but is not intended to limit this application. A person of ordinary skill in the art may know that as a network architecture evolves and new service scenarios emerge, the technical solutions provided in this application are also applicable to a similar technical problem.

Figure 2:
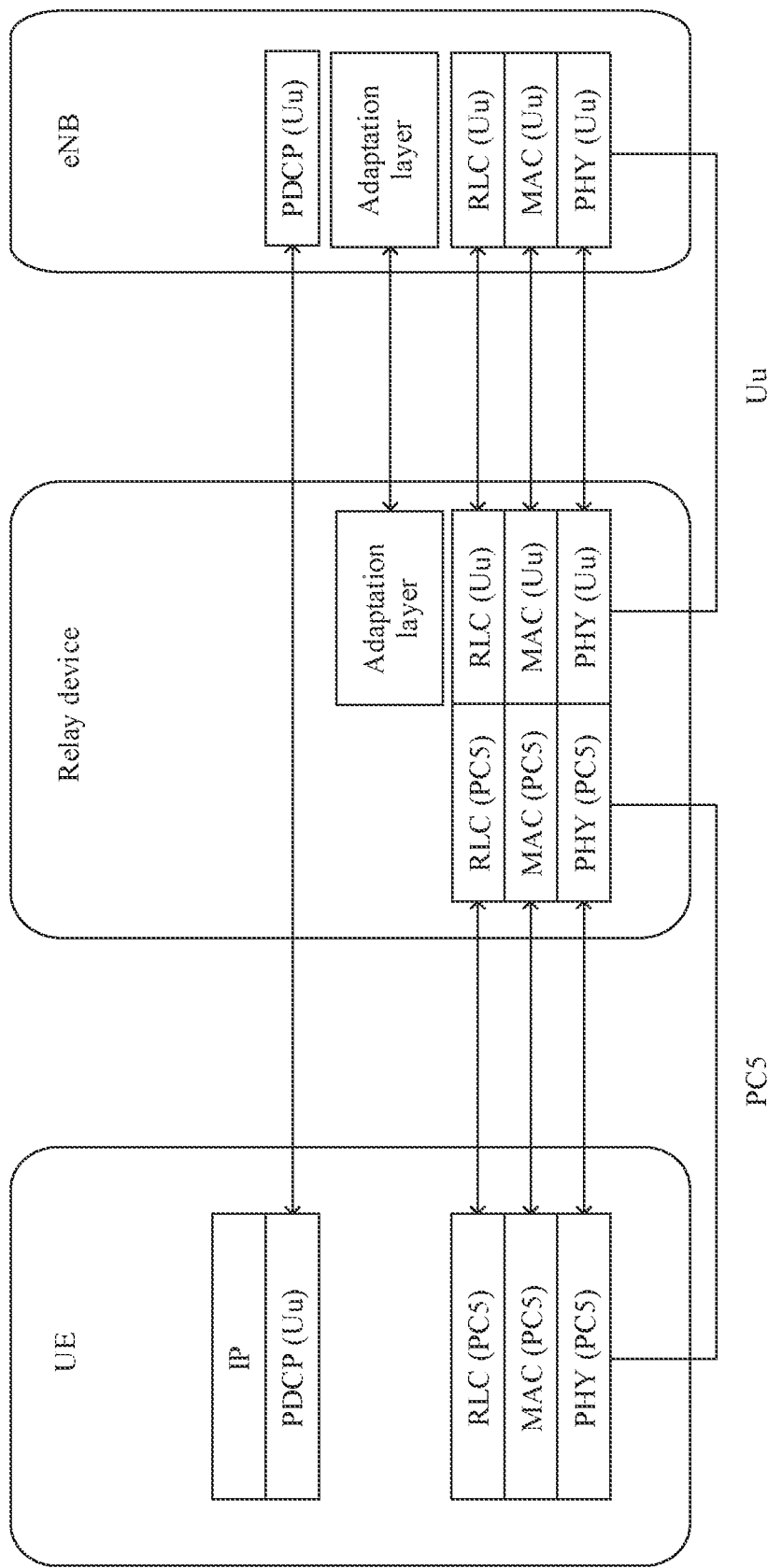
FIG. 2 is a schematic diagram of a user plane protocol stack in a communications system according to an embodiment of this application.

FIG. 2 is a schematic diagram of a user plane protocol stack in a communications system according to an embodiment of this application. A terminal device as a relay device has only a radio link control (RLC) layer/media access control (MAC) layer/physical (PHY) layer protocol stack on a user plane for a first terminal device, and has only an adaptation/RLC/MAC/PHY protocol stack on the user plane for a radio access network device (for example, an eNB in an LTE system or an en-gNB or a gNB in an NR system). For example, the radio access network device is the eNB in the LTE system as follows. The adaptation layer mainly includes at least one of the following information: an identifier used to identify the first terminal device on a PC5 interface, a data radio bearer (DRB) identifier of the first terminal device, or a logical channel identifier (LCID) corresponding to the first terminal device and the relay device. In addition, in the communications system shown in FIG. 2, a packet data convergence protocol (PDCP) layer of the first terminal device and a PDCP layer of the eNB are transparently transmitted through the relay device. That is, there is an end-to-end PDCP layer between the terminal device and the eNB, and the relay device does not parse the PDCP layer. In this embodiment of this application, the first terminal device may communicate with the relay device through an LTE/NR Uu air interface, a PC5 interface, or a sidelink interface, and the relay device communicates with the eNB through an LTE/NR Uu air interface. The terminal device communicates with a core network through an S1-U interface between the eNB and the CN and an S5 or S8 interface inside the CN. When the radio access network device is the gNB in the NR system, the terminal device communicates with the core network through an NG3 interface between the gNB and the CN.

Figure 3:
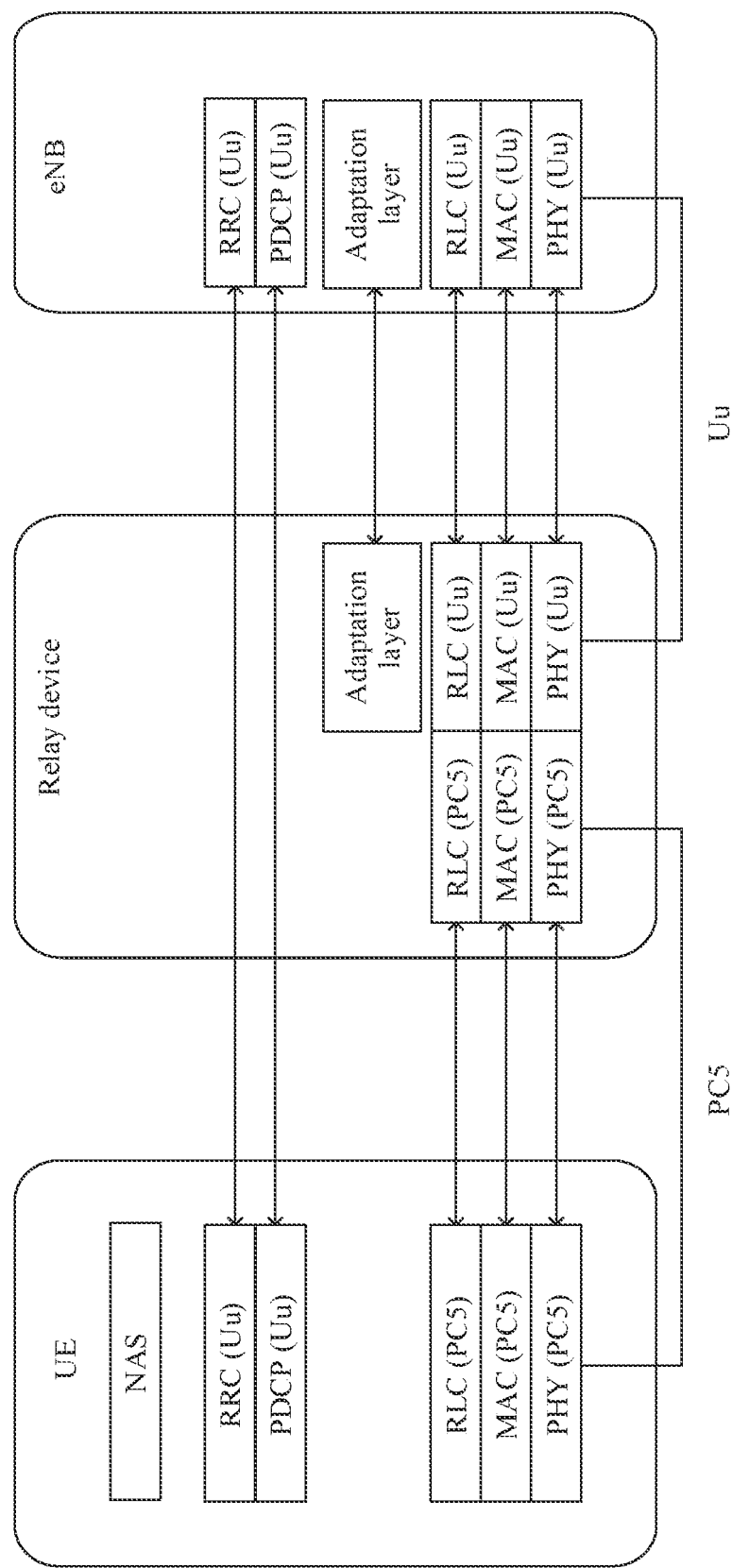
FIG. 3 is a schematic diagram of a control plane protocol stack in a communications system according to an embodiment of this application.

FIG. 3 is a schematic diagram of a control plane protocol stack in a communications system according to an embodiment of this application. A terminal device as a relay device has only a RLC/MAC/PHY protocol stack on a control plane for a first terminal device, and has only an adaptation/RLC/MAC/PHY layer protocol stack on the control plane for a radio access network device. In addition, in the communications system shown in FIG. 3, an RRC layer and a PDCP layer of the first terminal device and an RRC layer and a PDCP layer of the radio access network device are transparently transmitted through the relay device. That is, there is an end-to-end RRC layer and PDCP layer between the terminal device and an eNB, and the relay device does not parse the PDCP layer or the RRC layer. In addition, a control plane of the first terminal device further includes a non-access stratum (NAS) layer. The NAS layer of the first terminal device and a NAS layer of a core network are transparently transmitted through the relay device and the radio access network device. The first terminal device may communicate with the relay device through an LTE/NR Uu air interface, a PC5 interface, or a sidelink interface. The relay device communicates with the eNB through an LTE/NR Uu air interface, and the terminal device communicates with the core network through an S1-MME between the eNB and the CN. When the radio access network device is a gNB in an NR system, the terminal device communicates with the core network through an NG2/NG3 interface between the gNB and the CN.

Figure 4:
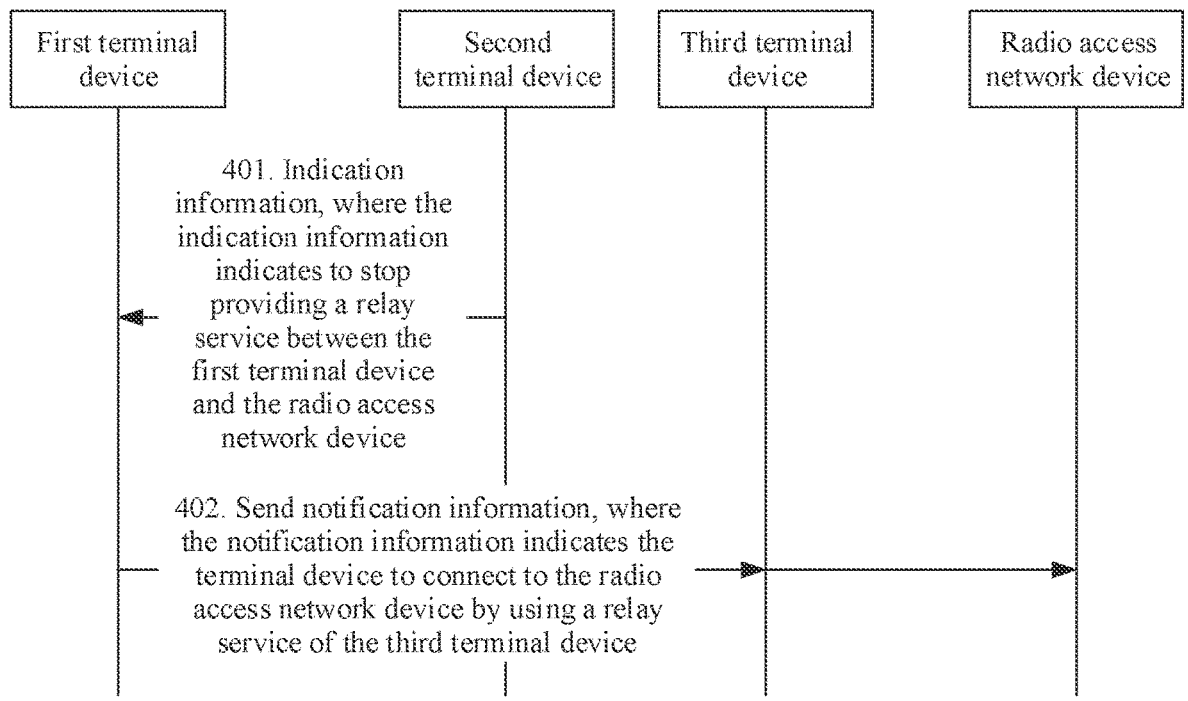
FIG. 4 is a schematic flowchart of a relay communications method according to an embodiment of this application.

FIG. 4 is a schematic flowchart of a relay communications method according to an embodiment of this application.

401. A first terminal device receives indication information from a second terminal device, where the indication information indicates the second terminal device to stop providing a relay service between the first terminal device and a radio access network device. Correspondingly, the second terminal device sends the indication information to the first terminal device.

Specifically, the second terminal device may be a device that currently provides a relay service between the first terminal device and the radio access network device.

It should be understood that the first terminal device in this embodiment of this application may be usually referred to as a remote first terminal device (remote user equipment). This is not limited in this application.

Optionally, an interface between the second terminal device and the first terminal device is a sidelink interface or a PC5 interface, for example, as shown in FIG. 2 or FIG. 3. An interface between the second terminal device and the radio access network device is an air interface, for example, may be an LTE air interface or an NR air interface.

Optionally, the second terminal device detects signal quality between the second terminal device and the radio access network device, and generates the indication information when detecting that the signal quality between the second terminal device and the radio access network device is less than or equal to a preset threshold.

Specifically, the second terminal device may detect the signal quality between the second terminal device and the radio access network device. If detecting that the signal quality does not meet a preset condition, for example, the signal quality is less than or equal to the preset threshold, the second terminal device generates the indication information and sends the indication information to the first terminal device. In other words, the second terminal device detects the signal quality, so that a terminal device having a relay function can be replaced in time, thereby avoiding communication efficiency interruption between the first terminal device and the access network device, and improving communication efficiency.

Optionally, the second terminal device may alternatively generate the indication information when detecting that signal quality between the second terminal device and the first terminal device is less than or equal to a preset threshold. This is not limited in this application.

Optionally, the second terminal device may alternatively generate the indication information when discovering that a radio link failure (RLF) occurs in a radio access network, for example, when the second terminal device discovers that T310 expires because a physical-layer monitoring signal deteriorates, discovers that random access at a MAC layer fails, or discovers that a quantity of RLC layer data retransmissions reaches a maximum quantity of retransmissions.

Optionally, the indication information may be carried in a PHY header or a MAC header of a user plane, or the indication information may be carried in a sidelink control indicator (SCI) or a MAC control element (CE) of a control plane. This avoids separately sending the indication information, and reduces signaling overheads.

Optionally, the indication information may directly indicate the second terminal device to stop providing the relay service for the first terminal device and the radio access network device.

Optionally, the indication information may alternatively indirectly indicate the second terminal device to stop providing the relay service for the first terminal device and the radio access network device. For example, the indication information indicates that the signal quality between the second terminal device and the radio access network device is less than or equal to the preset threshold. Alternatively, the indication information indicates that the signal quality between the second terminal device and the first terminal device is less than or equal to the preset threshold. Alternatively, the indication information indicates that a radio link failure occurs between the second terminal device and the radio access network device. That is, the second terminal device may flexibly select an indication manner. When receiving the indirect indication, the first terminal learns that the second terminal device is to stop providing the relay service for the first terminal device and the radio access network device.

402. The first terminal device sends notification information to the radio access network device through a third terminal device, where the notification information is used to indicate the first terminal device to connect to the radio access network device by using a relay service of the third terminal device. Correspondingly, the third terminal device receives the notification information from the first terminal device, and forwards the notification information to the radio access network device. The radio access network device receives the notification information.

The first terminal device receives, from the second terminal device, the indication information that indicates the second terminal device to stop providing the relay service for the first terminal device. The first terminal device then searches for the third terminal device, and then sends the notification information to the radio access network device through the third terminal device. The notification information is used to indicate the first terminal device to connect to the radio access network device by using a relay of the third terminal device. In this way, the radio access network device may communicate with the first terminal device through the third terminal device. This avoids communication interruption between the first terminal device and the radio access network device when the first terminal device suddenly discovers that the second terminal device cannot perform relay. Therefore, communication efficiency is improved.

Optionally, the indication information sent by the second terminal device to the first terminal device includes an identifier of the third terminal device. In this way, the first terminal device determines the third terminal device based on the identifier of the third terminal device, and sends the notification information to the radio access network device through the third terminal device. In other words, only after receiving the indication information, the first terminal device may learn of the third terminal device to be switched to.

Optionally, the first terminal device may also predetermine the third terminal device. For example, the first terminal device periodically searches for a relay device, or search for a potential relay device when the first terminal device discovers that signal quality between the first terminal device and a currently serving relay device is less than or equal to a specific threshold. In this case, after receiving the indication information, the first terminal device immediately starts to switch the relay device from the second terminal device to the third terminal device.

It should be noted that "switching between terminal devices having a relay function" in this embodiment of this application means changing a connection between the first terminal device and the radio access network device by using the relay of the second terminal device to a connection between the first terminal device and the radio access network device by using the relay of the third terminal device.

Optionally, the first terminal device receives at least one relay notification message broadcast by a relay device, where the relay notification message is used to indicate that a corresponding terminal device can provide a relay service for the first terminal device, and the first terminal device determines the third terminal device based on the at least one relay notification message.

Specifically, before switching between terminal devices having a relay function is performed, the first terminal device may search for a new relay device (which may be referred to as the "third terminal device" below). For example, the first terminal device may search for the new relay device after receiving the indication information sent by the second terminal device. The first terminal device may passively receive at least one relay notification message sent by surrounding relay devices. In other words, each relay device sends one relay notification message to indicate that the relay device can provide a relay service for the first terminal device and the radio access network device. For example, the first terminal device searches a receiving resource pool for the relay notification message. It should be understood that the resource pool may be a frequency domain resource including one or more radio resource blocks (RB), or a time-frequency domain resource including one or more RBs in a specific transmission time unit (for example, 1 ms) or a group of transmission time units. There may be one or more resource pools on each carrier. The receiving resource pool may be preset, or may be sent by the radio access network device to the first terminal device by using a broadcast message (for example, a physical broadcast channel PBCH) or an RRC message. In this way, the first terminal device selects a target terminal device from terminal devices corresponding to the at least one relay notification message as the third terminal device. The relay notification message may further carry a cell identifier, an identifier of the radio access network device, a radio access technology (RAT) indication (for example, LTE or NR), a timing advance (TA) value, a quantity of hops between the first terminal device and the radio access device, or the like. In this way, the first terminal device can determine, based on the relay notification message, a more appropriate third terminal device to provide a relay service for the first terminal device, thereby further improving communication efficiency.

Optionally, an interface between the third terminal device and the first terminal device is a sidelink interface or a PC5 interface, and an interface between the third terminal device and the radio access network device is an LTE air interface or an NR air interface.

Optionally, the first terminal device actively discovers a relay device. For example, the first terminal device sends a relay discovery request message, where the relay discovery request message is used to search for a terminal device having a relay function. The first terminal device receives a response message in response to the relay discovery request message, and determines a terminal device that sends the response message as the third terminal device.

Specifically, before switching between terminal devices having a relay function is performed, the first terminal device may actively search for a new relay device (which may be referred to as the "third terminal device" below). For example, the first terminal device may actively search for the new relay device after receiving the indication information. The first terminal device may broadcast the relay discovery request message, for example, send the relay discovery request message in a sending resource pool. Similarly, the sending resource pool may be preset, or may be sent by a base station to the first terminal device by using a broadcast message or an RRC message. The relay discovery request message may carry a device identifier of the first terminal device and a device identifier of the radio access network device. After receiving the relay discovery request message, when the terminal device having the relay function can provide a relay service for the first terminal device and the radio access network device, the terminal device having the relay function sends the response message to the first terminal device. The first terminal device uses the terminal device that sends the response message as the third terminal device. If there are a plurality of terminal devices that feed back response messages, the first terminal device may select any one as the third terminal device.

Optionally, the response message further includes a cell identifier, the radio access network device, a RAT indication, a TA value, a quantity of hops, or the like. In this way, when receiving a plurality of response messages, the first terminal device selects, from the plurality of terminal devices corresponding to the plurality of response messages, a more appropriate third terminal device to provide a relay service for the first terminal device, thereby further improving communication efficiency.

Optionally, the notification information further includes a device identifier of the first terminal device. It should be understood that the device identifier of the first terminal device may be a cell radio network temporary identifier (C-RNTI) of the first terminal device in a cell, a layer 2 (L2) identifier (for example, an identifier that uniquely identifies a terminal device on the PC5 interface) defined in the 3GPP standard, a MAC address, an IP address, or a local identifier allocated by a radio access network. This is not limited in this application.

Specifically, the radio access network device may learn, based on the device identifier, that switching is performed between terminal devices that have a relay function and that are of a first terminal device corresponding to the device identifier. In this way, when a plurality of first terminal devices perform relay switching, the radio access network device can accurately learn of a specific first terminal device that sends the notification information. When communicating with the first terminal device, the radio access network device can use the terminal device that is after switching, thereby improving communication efficiency.

In an embodiment, the notification information may be carried in an RRC message.

Specifically, the first terminal device may send an uplink RRC message that carries the notification information to the third terminal device. Correspondingly, the third terminal device receives the RRC message, does not parse the RRC message, and directly forwards the RRC message to the radio access network device. For example, the RRC message may be referred to as a relay addition message or a relay switch message.

When sending the notification information to the third terminal device, the first terminal device first uses the notification information as a load, encapsulates an RLC header, a MAC header, and a PHY header of the PC5 interface outside the load, and adds a first indication to the RLC/MAC/PHY header. The RLC header is, for example, an RLC header defined in the standard, the MAC header is, for example, a MAC header or a MAC subheader defined in the standard, and the PHY header is, for example, a resource allocation header resource allocation header defined in the standard. Before being processed at a specific protocol layer, data is referred to as a service data unit (SDU) of the layer, and after being processed (where for example, a header of the layer is added or encapsulated) at the layer, data is referred to as a protocol data unit (PDU) of the layer. A header of each protocol layer mainly includes load-related information. For example, the RLC layer header mainly includes information such as a data type (indicating whether the load is a data packet or a control packet), a sequence number, and an offset offset. The MAC header mainly includes information such as a logical channel number and a data length. For example, the notification information is used as an RLC SDU at an RLC layer, and after an RLC header is added, notification information becomes an RLC PDU. Processing at other layers can be deduced by analogy. The first indication is used to indicate that the load sent by the third terminal device on the PC5 interface is the RRC message sent to the radio access network device. Alternatively, before sending the notification information to the third terminal device, the first terminal device adds the first indication to the sidelink control information SCI. After receiving the SCI, the third terminal device learns, by using the first indication, that the load is the RRC message sent to the radio access network device. In addition, after receiving the RRC message from the first terminal device, the third terminal device removes the PHY/MAC/RLC on the sidelink/PC5 interface, and sends the RRC message including the notification information to the radio access network device by using a signaling radio bearer (SRB) or a DRB path between the third terminal device and the radio access network device, and the radio access network device obtains the notification information. When the RRC message is referred to as relay switch, the radio access network device learns, based on the notification information, that the first terminal device has completed switching from the second terminal device to the third terminal device. When the RRC message is referred to as relay addition, the radio access network device learns, based on the notification information, that the first terminal device adds the third terminal device as the relay device between the first terminal device and the radio access network device.

Optionally, when forwarding the RRC message, the third terminal device may further add an adaptation layer on an LTE/NR air interface PHY/MAC/RLC, where the adaptation layer includes the device identifier of the first terminal device. In this way, after receiving the RRC message, the radio access network device may decapsulate the LTE/NR air interface PHY/MAC/RLC to obtain the device identifier of the first terminal device. When the radio access network device obtains the device identifier of the first terminal device, the radio access network device can learn that the first terminal device changes from being connected to the radio access network device by using a relay of the second terminal device to being connected to the radio access network device by using a relay of the third terminal device.

It should be understood that after detecting that the radio access network device has established an RRC connection to the first terminal device corresponding to the identifier of the first terminal device, the radio access network device may further send the RRC message to a PDCP entity corresponding to an SRB1 of the first terminal device.

Optionally, the third terminal device adds the adaptation layer to the RLC. To enable the radio access network device to learn that the adaptation layer further exists above the RLC, the third terminal device may further send indication information to indicate that the adaptation layer exists.

In another embodiment, the notification information may also be carried in a PHY/MAC/PHY header of the PC5 interface. After obtaining the notification information, the third terminal device sends the first message to the radio access network device. The first message is used to notify the radio access network device that the third terminal device serves as the relay device between the first terminal device and the radio access network device. For example, the first message may be an uplink RRC message generated by the third terminal device. The first message may include the identifier of the first terminal device. The first message may be an implicit indication, or may carry an explicit indication, and is used to notify the radio access network device that the relay of the third terminal device is used by the first terminal device to connect to the radio access network device. For example, the first message is referred to as relay addition, or the first message includes an information element of relay addition. When the RRC message is referred to as relay switch, the radio access network device learns, based on the notification information, that the first terminal device has completed switching from the second terminal device to the third terminal device. When the RRC message is referred to as relay addition, the radio access network device learns, based on the notification information, that the first terminal device adds the third terminal device as the relay device between the first terminal device and the radio access network device.

Optionally, the second terminal device may send a to-be-transmitted signal of the first terminal device to the third terminal device. The to-be-transmitted signal may be a downlink signal that is sent by the radio access network and received by the second terminal device, and that has not been sent to the first terminal device or that is not successfully sent to the first terminal device, or may be an uplink signal that is sent by the first terminal device and received by the second terminal device, and that has not been sent to the radio access network device or that is not successfully sent to the radio access network device.

Specifically, the second terminal device may forward, through the third terminal device, the to-be-transmitted signal of the first terminal device sent to the radio access network device. Alternatively, the second terminal device may forward, through the third terminal device, the to-be-transmitted signal sent to the first terminal device, thereby avoiding data loss caused by switching between terminal devices having a relay function, and improving signal quality.

It should be noted that the to-be-transmitted signal may be a signal of the first terminal device that fails to be sent after the second terminal device sends the signal, or may be a signal of the first terminal device that has not been forwarded by the second terminal device. This is not limited in this application.

It should be understood that the to-be-transmitted signal may be a downlink signal, or may be an uplink signal. The downlink signal may be data or signaling. This is not limited in this application. The uplink signal may be data, signaling, or the like. This is not limited in this application. In the following embodiments, the data is used as an example for description.

Figure 5:
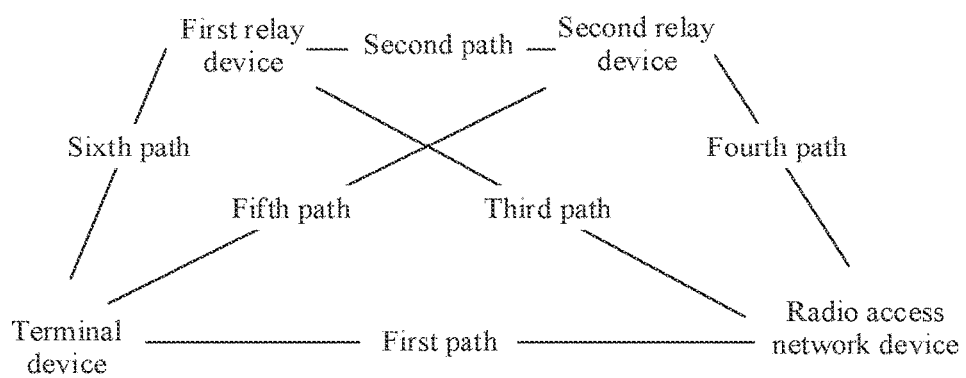
FIG. 5 is a schematic diagram of a transmission path according to an embodiment of this application.

FIG. 5 is a schematic diagram of a transmission path according to an embodiment of this application.

Optionally, the first terminal device receives a PDCP status report from the radio access network device, where the PDCP status report is used to indicate whether the radio access network device successfully receives uplink PDCP data. After the first terminal device receives the PDCP status report of the radio access network device, when the PDCP status report indicates that receiving fails, the first terminal device resends, to the radio access network device through the third terminal device, data that fails to be transmitted.

Specifically, the radio access network device periodically feeds back the PDCP status report, where the PDCP status report includes a packet loss status. For example, the PDCP status report includes the first missing PDCP serial number (SN) number and a bitmap, and a value of the bitmap indicates whether each subsequent PDCP SN is lost from the first missing packet serial number (FMS). The first terminal device resends, to the radio access network device based on the PDCP status report through the third terminal device, uplink data that fails to be sent through the second terminal device.

Optionally, the radio access network device receives a PDCP status report from the first terminal device, where the PDCP status report is used to indicate whether the first terminal device successfully receives downlink PDCP data. After the radio access network device receives the PDCP status report of the first terminal device, when the PDCP status report indicates that receiving fails, the radio access network device resends the downlink data to the first terminal device through the third terminal device.

Specifically, the first terminal device may also periodically feed back a PDCP status report. The PDCP status report is similar to the foregoing PDCP status report. In this way, the radio access network device may determine, based on the PDCP status report, whether data is successfully received. When the PDCP status report indicates that data receiving fails, the radio access network device resends the first data to the first terminal device through the third terminal device.

Optionally, the second terminal device determines an identifier of a second path based on a first path that carries the uplink signal and a first mapping relationship, and sends, to the third terminal device on a path corresponding to the identifier of the second path, the uplink data received on the first path, so that the third terminal device sends the uplink data to the radio access network device. The first mapping relationship is a one-to-one mapping relationship between an identifier of at least one first path and an identifier of at least one second path.

Specifically, the first mapping relationship is the one-to-one mapping relationship between the identifier of the at least one first path and the identifier of the at least one second path. The identifier of the first path may be a bearer identifier of the first terminal device, the identifier of the second channel may be an identifier of a second logical channel, and a bearer corresponding to the bearer identifier of the first terminal device may be used for communication between the first terminal device and the radio access network device. A logical channel corresponding to the identifier of the second logical channel may be used for communication between the second terminal device and the third terminal device. There may be one or more bearers between the first terminal device and the radio access network device, or there may be one or more logical channels between the second terminal device and the third terminal device. The second terminal device receives the uplink data from the first terminal device, and may determine, based on an identifier (the following identifier is a bearer identifier of the first terminal device) of a bearer, of the first terminal device, that carries the uplink data and with reference to the first mapping relationship, to send the uplink data on a specified second logical channel in a plurality of second logical channels, so that the second terminal device regularly sends unsuccessfully sent uplink data to the third terminal device on the second logical channel, so that the third terminal device subsequently forwards the data to the radio access network device. Therefore, a packet loss problem caused by a change of terminal devices having a relay function is avoided, and communication efficiency is improved.

It should be noted that if bearer identifiers of different first terminal devices are separately numbered, the second terminal device may determine a corresponding bearer based on the identifier of the first terminal device and the bearer identifier of the first terminal device together. For example, a second relay device receives an RRC configuration message sent by the radio access network device, where the RRC configuration message includes the identifier of the first terminal device and a mapping relationship between the bearer identifier of the first terminal and an identifier of a sixth path. The sixth path is a transmission path between the first terminal device and the second terminal device, and the identifier of the sixth path may be an identifier, of a logical channel, used for transmitting data on the transmission path. The second terminal device receives the data from the first terminal device on the sixth path, and obtains the logical channel identifier corresponding to the sixth path. Then, the second terminal device obtains the corresponding bearer identifier of the first terminal device based on the logical channel identifier and the mapping relationship.

It should be understood that, without special description, the bearer in this embodiment of this application may be an SRB or a DRB. A path between terminal devices having a relay function or a path between the first terminal device and a terminal device having a relay function in this embodiment of this application may be a logical channel. The following embodiment uses the logical channel as an example for description. This is not limited in this application.

Optionally, the second terminal device determines the identifier of the second path based on a third path that carries the downlink signal, the first mapping relationship, and the second mapping relationship, and sends the downlink data received on the third path to the third terminal device on the second path corresponding to the identifier of the second path. Further, the third terminal device sends the downlink data to the first terminal device, where the first mapping relationship is a one-to-one mapping relationship between the identifier of the at least one first path and the identifier of the at least one second path, and the second mapping relationship is a one-to-one mapping relationship between an identifier of at least one third path and the identifier of the at least one first path.

Specifically, the identifier of the first path may be the bearer identifier of the first terminal device, the identifier of the second path may be the identifier of the second logical channel, and the identifier of the third path may be the bearer identifier of the second terminal device. A bearer corresponding to the bearer identifier of the first terminal device may be used for communication between the first terminal device and the radio access network device. A logical channel corresponding to the identifier of the second logical channel may be used for communication between the second terminal device and the third terminal device, and a bearer corresponding to the bearer identifier of the second terminal device may be used for communication between the second terminal device and the radio access network device. There may be one or more bearers between the first terminal device and the radio access network device, there may be one or more logical channels between the second terminal device and the third terminal device, and there may be one or more bearers between the second terminal device and the radio access network device. The second terminal device receives the downlink data from the radio access network device, where the downlink data is carried on a third channel (namely, the bearer of the second terminal device), and determines, based on the third channel and a third mapping relationship, the bearer identifier, of the first terminal device, corresponding to an identifier of the third channel. Then, the identifier of the second channel (that is, the identifier of the second logical channel) is determined based on the bearer identifier of the first terminal device and the first mapping relationship, and the downlink data is further carried on the second logical channel corresponding to the identifier of the second logical channel. In this way, the second terminal device regularly sends an unsuccessfully sent downlink signal to the third terminal device on the second logical channel, and the third terminal device forwards the downlink signal to the first terminal device. This avoids a packet loss problem caused by a change of terminal devices having a relay function, and improves communication efficiency.

Optionally, the first mapping relationship may be determined by the second terminal device and sent to the third terminal device. Alternatively, the first mapping relationship is determined by the radio access network device, and is sent to the second terminal device and the third terminal device.

Optionally, the radio access network device may send the first mapping relationship only to the second terminal device, and the second terminal device sends the first mapping relationship to the third terminal device. Specifically, the second terminal device may send SCI to the third terminal device, where the SCI carries the first mapping relationship, thereby avoiding separately sending the first mapping relationship, and reducing signaling overheads.

Optionally, the second mapping relationship may be sent by the radio access network device to the second terminal device.

Optionally, the third terminal device may determine a fourth path based on the identifier of the second logical channel, the first mapping relationship, and the third mapping relationship, where the first mapping relationship is a one-to-one mapping relationship between the identifier of the at least one first path and the identifier of the at least one second path. The third mapping relationship is a mapping relationship between an identifier of at least one fourth path and the identifier of the at least one first path.

Specifically, when the second terminal device sends the to-be-sent uplink data to the radio access network device, the second terminal device may send the uplink data to the third terminal device, and the third terminal device forwards the uplink data to the radio access network device. The fourth path is a path between the third terminal device and the radio access network device. When the identifier of the first path is the bearer identifier of the first terminal device, and the identifier of the fourth path is a bearer identifier of the third terminal device, the first mapping relationship is a one-to-one mapping relationship between a bearer identifier of the at least one first terminal device and an identifier of at least one second logical channel, and the third mapping relationship is a one-to-one mapping relationship between a bearer identifier of at least one third terminal device and a bearer identifier of at least one first terminal device. In this way, the third terminal device may determine the bearer identifier of the first terminal device based on the identifier of the second logical channel and the first mapping relationship, and then determine the bearer identifier of the third terminal device based on the bearer identifier of the first terminal device and the third mapping relationship. Further, the third terminal device sends the uplink data to the radio access network device by using a bearer corresponding to the bearer identifier of the third terminal device, thereby improving communication efficiency.

Optionally, the third terminal device may determine a fifth path based on the identifier of the second path, the first mapping relationship, and a fourth mapping relationship, where the first mapping relationship is a one-to-one mapping relationship between the identifier of the at least one first path and the identifier of the at least one second path. The fourth mapping relationship is a one-to-one mapping relationship between an identifier of at least one fifth path and the identifier of the at least one first path.

Specifically, when the second terminal device sends the downlink data to the first terminal device, the third terminal device may determine the fifth path based on the second path, the first mapping relationship, and the fourth mapping relationship. The fifth channel is used by the first terminal device to communicate with the third terminal device, and the fifth path may be a fifth logical channel. When the identifier of the first path is the bearer identifier of the first terminal device, the first mapping relationship is a one-to-one mapping relationship between the bearer identifier of the at least one first terminal device and the identifier of the at least one second logical channel. The fourth mapping relationship is a one-to-one mapping relationship between an identifier of at least one fifth logical channel and the bearer identifier of the at least one first terminal device. In this way, the third terminal device may determine the bearer identifier of the first terminal device based on the second logical channel and the first mapping relationship, and then determine an identifier of the fifth logical channel based on the bearer identifier of the first terminal device and the fourth mapping relationship. Further, the third terminal device sends the downlink data to the first terminal device on the logical channel corresponding to the identifier of the fifth logical channel, thereby improving communication efficiency.

Optionally, the third mapping relationship or the fourth mapping relationship may be determined by the radio access network device, and sent by the radio access network device to the third terminal device.

Optionally, the third mapping relationship or the fourth mapping relationship may alternatively be carried in an RRC reconfiguration message.

Optionally, after the first terminal device performs switching from the second terminal device to the third terminal device, the uplink signal or the downlink signal that is not forwarded by the second terminal device may be forwarded through the third terminal device. Specifically, the radio access network device may retransmit the downlink data, and the first terminal device retransmits the uplink data. Alternatively, the radio access network device retransmits the downlink data, and the second terminal device retransmits the uplink data (to be specific, the second terminal device forwards the uplink data to the third terminal device, and the third terminal device sends the uplink data to the radio access network device). Alternatively, the second terminal device retransmits the downlink data (to be specific, the second terminal device forwards the downlink data to the third terminal device, and sends the downlink data to the first terminal device through the third terminal device), and the first terminal device retransmits the uplink data. Alternatively, the second terminal device retransmits the downlink data, and the second terminal device retransmits the uplink data.

In an embodiment of this application, the first terminal device determines a fourth terminal device, where the fourth terminal device is a relay device, together with the second terminal device or the third terminal device, that can provide a relay service for the first terminal device and the radio access network device, and the first terminal device sends, to the radio access network device through the fourth terminal device, notification information used to indicate that the fourth terminal device and the second terminal device or the third terminal device can both provide the relay service for the first terminal device and the radio access network device.

Specifically, when the first terminal device discovers that the fourth terminal device can also provide the relay service for the first terminal device and the radio access network device, the first terminal device may perform relay device addition, that is, the first terminal device establishes a relay multi-connection. For example, the first terminal device may establish a connection to the fourth terminal device as the relay device and the second terminal device as the relay device, or the first terminal device may establish a connection to the fourth terminal device and the third terminal device, and notify the radio access network device through the fourth terminal device. In this way, the radio access network device may send downlink data to the first terminal device through both the second terminal device and the fourth terminal device, or send downlink data to the first terminal device through both the third terminal device and the fourth terminal device, thereby improving communication efficiency.

It should be noted that if a device that currently provides a relay service for the first terminal device and the radio access network device is the second terminal device, after the fourth terminal device is added, the second terminal device and the fourth terminal device both provide the relay service for the first terminal device and the radio access network device. If a device that currently provides a relay service for the first terminal device and the radio access network device is the third terminal device, after the fourth terminal device is added, the third terminal device and the fourth terminal device both provide the relay service for the first terminal device and the radio access network device.

Figure 6:
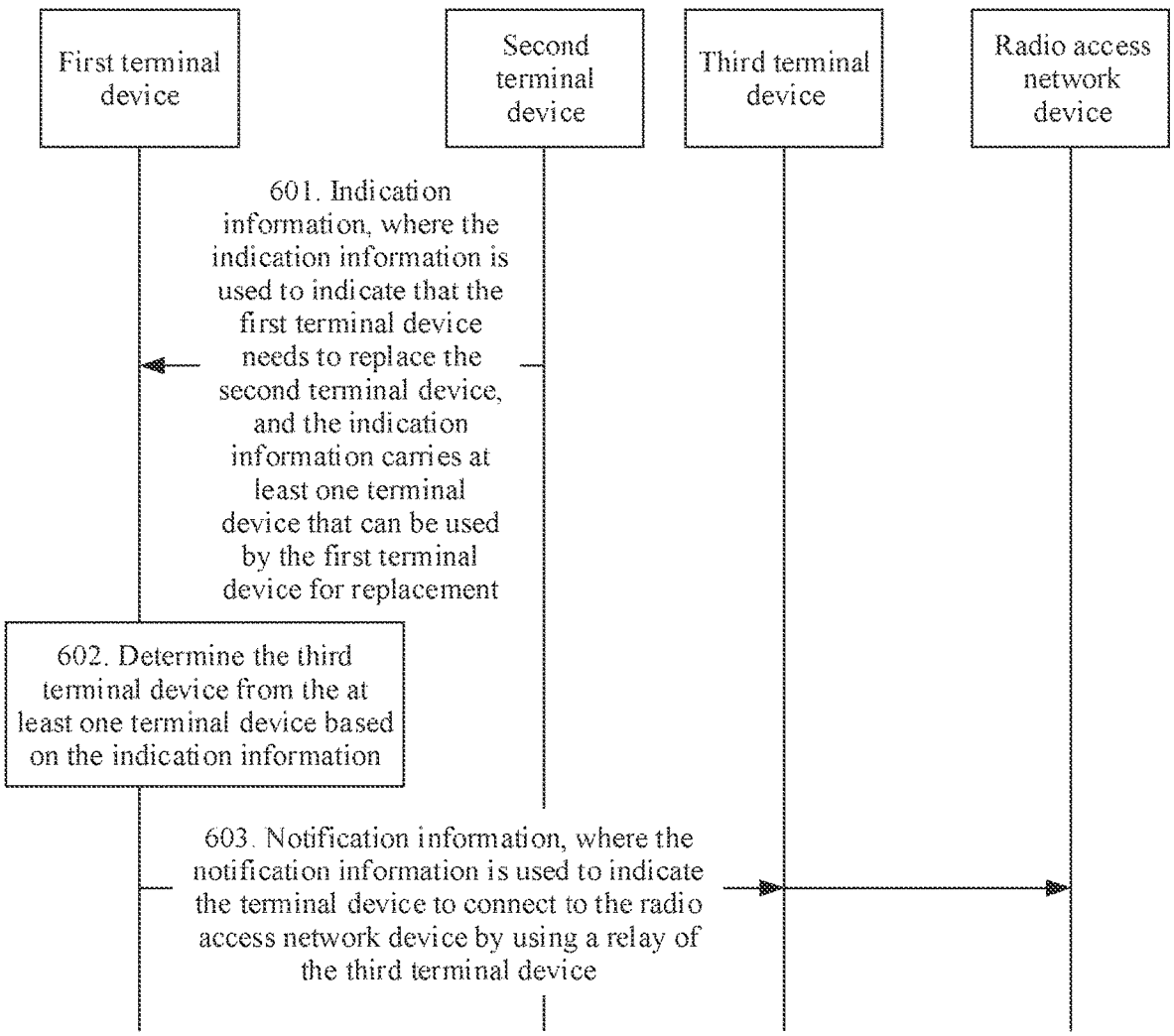
FIG. 6 is a schematic flowchart of a relay communications method according to another embodiment of this application.

FIG. 6 is a schematic flowchart of a relay communications method according to another embodiment of this application.

It should be noted that, in the embodiment shown in FIG. 6 and the foregoing embodiment, meanings of same terms are the same unless otherwise specified.

601. A first terminal device receives indication information, where the indication information is used to indicate that the first terminal device needs to replace a second terminal device, the second terminal device is a device that currently provides a relay service for the first terminal device, and the indication information carries at least one terminal device that can be used by the first terminal device for replacement. Correspondingly, a radio access network device receives the indication information.

Specifically, the second terminal device is the device that currently provides the relay service for communication between the first terminal device and the radio access network, the indication information carries the at least one terminal device that can be used by the first terminal device for replacement, and the at least one terminal device may be carried in the indication information in a form of a list.

Optionally, an interface through which the first terminal device communicates with the second terminal device is a PC5 interface or a sidelink interface.

Specifically, the interface between the second terminal device and the first terminal device is the sidelink interface or the PC5 interface, for example, as shown in FIG. 2 or FIG. 3. In other words, the second terminal device may be a device of a terminal device type. An interface between the second terminal device and the radio access network device is an air interface, for example, may be an LTE air interface or an NR air interface.

Optionally, the radio access network device detects signal quality between the first terminal device and the second terminal device, and generates the indication information when the signal quality between the first terminal device and the second terminal device is less than or equal to a first preset threshold.

Specifically, the radio access network device detects that the signal quality between the first terminal device and the second terminal device is relatively poor. For example, the radio access network device learns of the signal quality between the second terminal device and the first terminal device from the second terminal device, or the signal quality, between the second terminal device and the first terminal device, that is obtained through measurement by the first terminal device and that is forwarded by the second terminal device.

Optionally, the radio access network device detects signal quality between the radio access network device and the second terminal device, and generates the indication information when the signal quality between the radio access network device and the second terminal device is less than or equal to a second preset threshold.

Specifically, the radio access network device detects that a signal between the radio access network device and the second terminal device is relatively poor. For example, the radio access network device measures quality of an uplink signal (sounding reference signal (SRS)) of the second terminal device, or a layer 3 measurement report (for example, reference signal received power (RSRP) or reference signal received quality (RSRQ)) or layer 2 channel state information (CSI) feedback (for example, a channel quality indicator (CQI))/precoding matrix indicator (PMI)/rank indication (RI)) that is reported by the second terminal device and that is defined in the 3GPP standard.

It should be understood that a layer 2 may be at least one of a MAC layer, an RLC layer, a PDCP layer, or an adaptation layer. The layer 3 may be an RRC layer or a layer, for example, an IP layer, a UDP layer/TCP layer, or an application layer, above the RRC layer.

Optionally, when a direct air interface exists between the radio access network device and the first terminal device (for example, in an in cellular coverage (ICC) scenario), the radio access network device may directly send the indication information to the first terminal device. For example, the radio access network device may carry the indication information by using an RRC reconfiguration message.

Optionally, the radio access network device may send the indication information to the first terminal device through the second terminal device, for example, in an out of cellular coverage (OCC) scenario. Alternatively, the radio access network device may send an RRC reconfiguration message to the first terminal device through the second terminal device, where the RRC reconfiguration message carries the indication information.

602. The first terminal device determines a third terminal device from the at least one terminal device based on the indication information.

Specifically, an interface between the third terminal device and the first terminal device is also a PC5 interface (which is also referred to as a sidelink interface), and an interface between the third terminal device and the radio access network device may be an LTE air interface or an NR air interface.

Optionally, the first terminal device performs switching from the second terminal device to the third terminal device.

Specifically, the switching may be understood as changing the second terminal device that is used by the first terminal device to access the access network device to the third terminal device that is used by the first terminal device to access the access network device.

603. The first terminal device sends notification information to the radio access network device through the third terminal device, where the notification information is used to indicate the first terminal device to connect to the radio access network device through the third terminal device.

Specifically, the first terminal device receives the indication information that is sent by the radio access network device and that is used to indicate that the first terminal device needs to replace the second terminal device, and the indication information further carries the at least one terminal device that can be used for replacement. In this way, the first terminal device can select an appropriate third terminal device based on the indication information, so that the first terminal device does not need to actively search for the appropriate third terminal device, and power consumption of the first terminal device is reduced. Communication is performed through the appropriate third terminal device, and communication efficiency between the first terminal device and the radio access network device is also improved.

Figure 7:
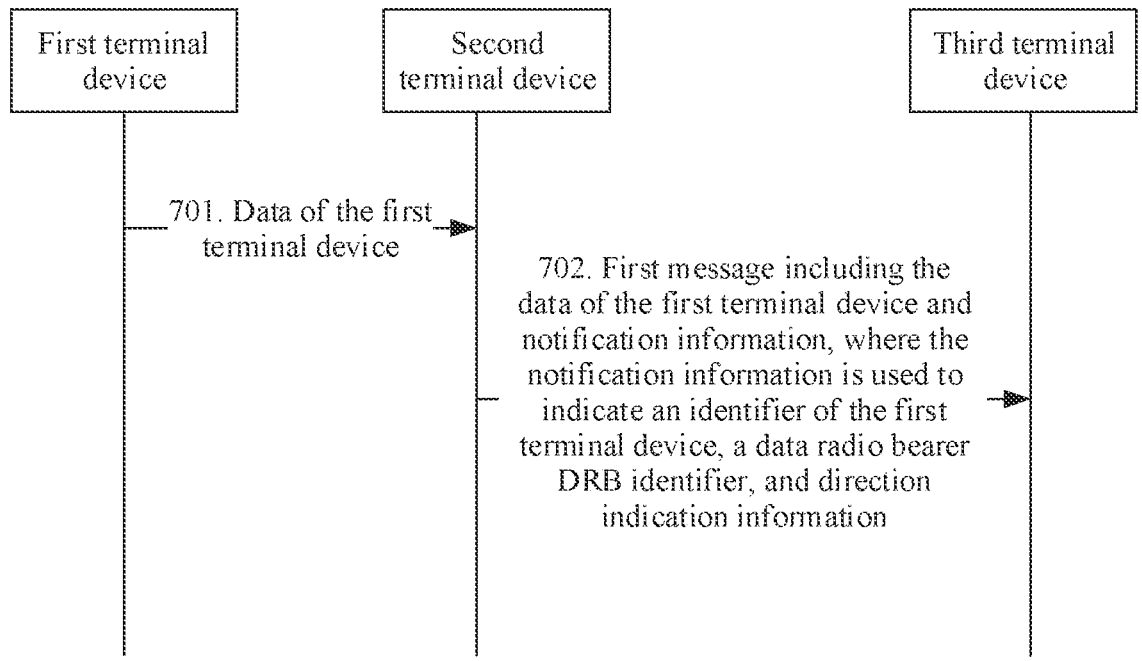
FIG. 7 is a schematic flowchart of a relay communications method according to still another embodiment of this application.

FIG. 7 is a schematic flowchart of relay communications according to still another embodiment of this application.

It should be noted that, unless otherwise specified, same terms in this embodiment of this application and the foregoing embodiment have a same meaning.

It should be further understood that this embodiment of this application may be independently performed, or may be combined with any one of the foregoing solutions. This is not limited in this application.

It should be noted that this embodiment of this application is applied to a communications system including a first terminal device, a second terminal device, a third terminal device, and a radio access network device, where the third terminal device is a device that currently provides a relay service for the first terminal device and the radio access network device, and the second terminal device is a device that provides a relay service for the first terminal device and the radio access network device before the third terminal device.

701. The second terminal device receives data of the first terminal device.

Specifically, the data of the first terminal device may be data that has not been successfully forwarded by the second terminal device, or may be data that has not been forwarded.

In addition, the data of the first terminal device may be uplink data, or may be downlink data. This is not limited in this application.

702. The second terminal device sends a first message to the third terminal device, where the first message includes the data of the first terminal device and notification information, the notification information is used to indicate an identifier of the first terminal device, a data radio bearer DRB identifier, and direction indication information, the DRB identifier is used to indicate a DRB that carries the data of the first terminal device and that is between the first terminal device and the radio access network device, and the direction indication information is used to indicate a transmission direction of the data of the first terminal device.

Specifically, there may be a plurality of bearers for communication between the first terminal device and the radio access network device, and the bearer may be the DRB. The first message carries a bearer identifier corresponding to a piece of data (indicated as the data of the first terminal device in the following) of the first terminal device, the identifier of the first terminal device, and the direction indication information. The direction indication information may indicate whether the data of the first terminal device is uplink data or downlink data. If the data is the uplink data, the third relay device subsequently forwards the data to the radio access network device. If the data is the downlink data, the third relay device subsequently forwards the data to the first terminal device. In addition, the data of the first terminal device and the notification information may be carried in a same message (namely, the first message). In this way, after receiving the first message, the third terminal device may learn of a terminal device whose data is the data included in the first message and the DRB identifier corresponding to the data of the first terminal device, so that the third terminal device can accurately determine, based on the first message, a receive end to which the data of the first terminal device is sent (where for example, the uplink data is sent to the radio access network device, and the downlink data is sent to the first terminal device), and a path (to be specific, a path between the third terminal device and the radio access network device, or a path between the third terminal device and the first terminal device) to be used, to improve communication efficiency.

In an embodiment, the notification information may be carried in SCI. In this way, the SCI and the data of the first terminal device may be in a same message, and time for transmitting the SCI and time for transmitting the data of the first terminal device may be the same or different. For example, a time domain resource for transmitting the SCI is before a time domain resource for transmitting the data of the first terminal device.

It should be understood that the time domain resource may be in a unit of at least one time domain symbol, where one transmission time unit consists of 12 or 14 time domain symbols, and the time transmission unit occupies 1 ms in LTE, where the transmission time unit is referred to as a subframe including two slots, and also occupies 1 ms in NR, where the transmission time unit is referred to as a slot. This is not limited in this application.

In another embodiment, the notification information may be carried in an adaptation layer in the first message. For example, when sending the data of the first terminal device to a third relay device, a second relay device encapsulates an adaptation layer header, an RLC header, a MAC header, and a PHY header of a PC5 interface outside the data, and includes the identifier of the first terminal device, the bearer identifier of the first terminal device, and direction indication information in the adaptation layer. Particularly, the direction indication information may be a UL or a DL indication. UL may be indicated when the direction indication information is carried, and DL may be indicated when the direction indication information is not carried. Alternatively, DL is indicated when the direction indication information is carried, and UL is indicated when the direction indication information is not carried.

Specifically, the second terminal device may encapsulate the data of the first terminal device and the notification information by using the adaptation layer to obtain the first message, and send the first message to the third terminal device, and the third terminal device obtains the notification information by parsing the adaptation layer.

In another embodiment, the notification information may be carried at a MAC layer or another layer in the first message.

The foregoing describes in detail the relay communications method according to the embodiments of this application. The following describes relay communications apparatuses according to the embodiments of this application.

Figure 8:
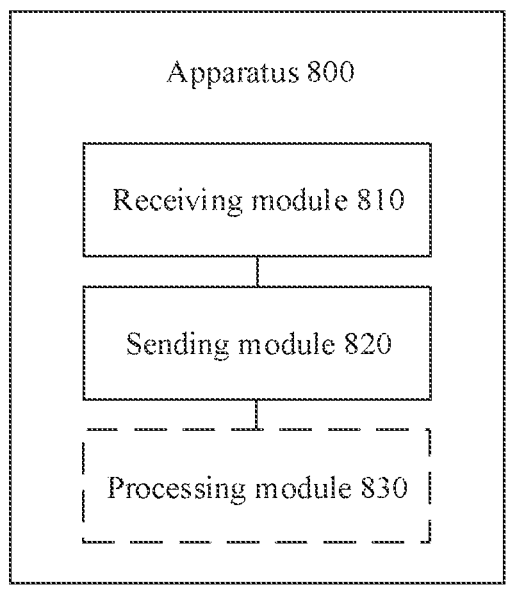
FIG. 8 is a schematic block diagram of a relay communications apparatus according to an embodiment of this application.

FIG. 8 is a schematic block diagram of a relay communications apparatus 800 according to an embodiment of this application.

It should be understood that the apparatus 800 may correspond to the terminal device in the embodiment shown in FIG. 4, and may have any function of the first terminal device in the methods. The apparatus 800 may include a receiving module 810 and a sending module 820.

The receiving module 810 is configured to receive indication information from a second terminal device, where the indication information is used to indicate to stop providing a relay service between a first terminal device and a radio access network device.

The sending module 820 is further configured to send notification information to the radio access network device through a third terminal device, where the notification information indicates the first terminal device to connect to the radio access network device through the third terminal device.

Optionally, the indication information indicates that signal quality between the second terminal device and the radio access network device is less than or equal to a preset quality threshold.

Optionally, the indication information indicates that a radio link failure occurs between the second terminal device and the radio access network device.

Optionally, the indication information further indicates an identifier of the third terminal device, and the apparatus 800 further includes a processing module 830. The processing module 830 is configured to determine the third terminal device based on the identifier of the third terminal device.

Optionally, the notification information further indicates an identifier of the first terminal device.

Optionally, the sending module 810 is further configured to send the identifier of the third terminal device to the second terminal device.

Figure 9:
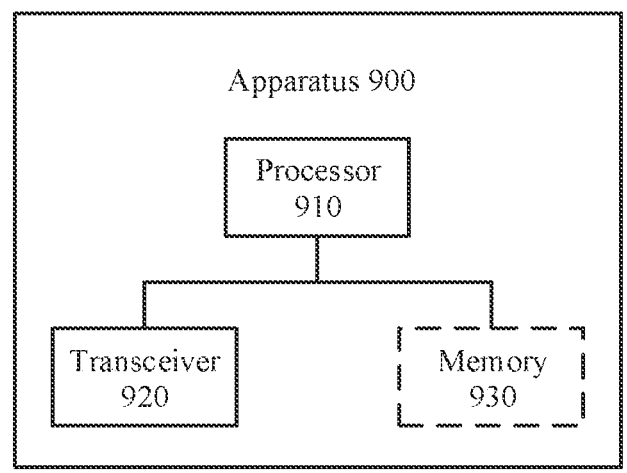
FIG. 9 is a schematic structural diagram of a relay communications apparatus according to an embodiment of this application.

FIG. 9 is a schematic block diagram of a relay communications apparatus 900 according to an embodiment of this application. The apparatus 900 may be the terminal device in FIG. 1 and the terminal device in FIG. 4. The apparatus 900 may use a hardware architecture shown in FIG. 9. The apparatus 900 may include a processor 910 and a transceiver 920. Optionally, the apparatus 900 may further include a memory 930. The processor 910, the transceiver 920, and the memory 930 communicate with each other by using an internal connection path. Related functions implemented by the processing module 830 in FIG. 8 may be implemented by the processor 910, and related functions implemented by the receiving module 810 and the sending module 820 may be implemented by the processor 910 by controlling the transceiver 920.

Optionally, the processor 910 may be a general-purpose central processing unit (CPU), a microprocessor, an application-specific integrated circuit (ASIC), a dedicated processor, or one or more integrated circuits configured to perform the technical solutions in the embodiments of this application. Alternatively, the processor may be one or more devices, circuits, and/or processing cores for processing data (for example, computer program instructions). For example, the processor may be a baseband processor or a central processing unit. The baseband processor may be configured to process a communications protocol and communications data, and the central processing unit may be configured to: control a relay communications apparatus (such as a base station, a terminal device, or a chip), execute a software program, and process data of the software program.

Optionally, the processor 910 may include one or more processors, for example, include one or more central processing units (CPU). When the processor is one CPU, the CPU may be a single-core CPU, or may be a multi-core CPU.

The transceiver 920 is configured to send a signal and receive a signal. The transceiver may include a transmitter and a receiver. The transmitter is configured to send a signal, and the receiver is configured to receive a signal. It should be understood that the signal may be data and/or signaling.

The memory 930 includes but is not limited to a random access memory (RAM), a read-only memory (ROM), an erasable programmable memory (EPROM), and a compact disc read-only memory (CD-ROM). The memory 930 is configured to store related instructions and data.

The memory 930 is configured to store program code and data of a terminal device, and may be a separate device or integrated into the processor 910.

Specifically, the processor 910 is configured to control the transceiver to perform information transmission with a radio access network device. For details, refer to the descriptions in the foregoing method embodiments. Details are not described herein again.

It may be understood that FIG. 9 merely shows a simplified design of the relay communications apparatus. During actual application, the apparatus may further include other necessary components, including but not limited to any quantity of transceivers, processors, controllers, memories, and the like, and all terminal devices that can implement this application shall fall within the protection scope of this application.

In a possible design, the apparatus 900 may be a chip, for example, may be a communications chip that can be used in a terminal device, and configured to implement a related function of the processor 910 in the terminal device. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, and be configured to store program code. When the code is executed, the processor is enabled to implement a corresponding function.

During specific implementation, in an embodiment, the apparatus 900 may further include an output device and an input device. The output device communicates with the processor 910, and may display information in a plurality of manners. For example, the output device may be a liquid crystal display (LCD), a light emitting diode (LED) display device, a cathode ray tube (CRT) display device, a projector, or the like. The input device communicates with the processor 801, and may receive an input from a user in a plurality of manners. For example, the input device may be a mouse, a keyboard, a touchscreen device, a sensing device, or the like.

Figure 10:
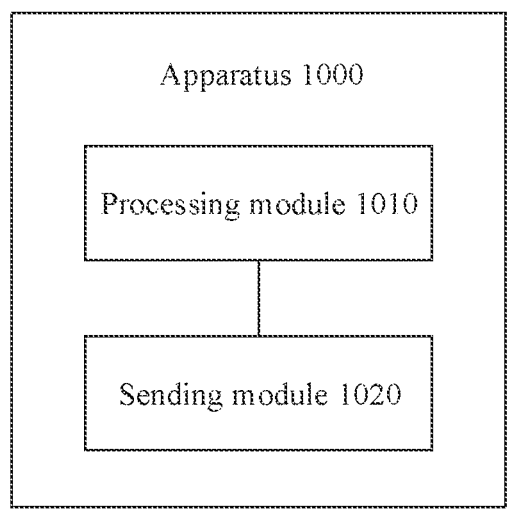
FIG. 10 is a schematic block diagram of a relay communications apparatus according to another embodiment of this application.

FIG. 10 is a schematic block diagram of a relay communications apparatus 1000 according to an embodiment of this application.

It should be understood that the apparatus 1000 may correspond to the terminal device in the embodiment shown in FIG. 4, and may have any function of the second terminal device in the methods. The apparatus 1000 includes a processing module 1010 and a sending module 1020.

The processing module 1010 is configured to generate indication information, where the indication information is used to indicate to stop providing a relay service between a first terminal device and a radio access network device.

The sending module 1020 is configured to send the indication information to the first terminal device.

Optionally, the indication information indicates that signal quality between the second terminal device and the radio access network device is less than a preset threshold.

Optionally, the indication information indicates that a radio link failure occurs between the second terminal device and the radio access network device.

Optionally, the sending module 1020 is further configured to send to-be-sent data of the first terminal device to a third terminal device, where the third terminal device is a device that currently provides a relay service for the first terminal device and the radio access network device, and the second terminal device is a device that previously provides a relay service for the first terminal device and the radio access network device.

Optionally, the sending module 1020 is specifically configured to:

send a first message, where the first message includes the to-be-sent data, the first message further includes an identifier of the first terminal device, an identifier of a first path, and transmission direction indication information, and the first path is used for communication between the first terminal device and the radio access network device.

Figure 11:
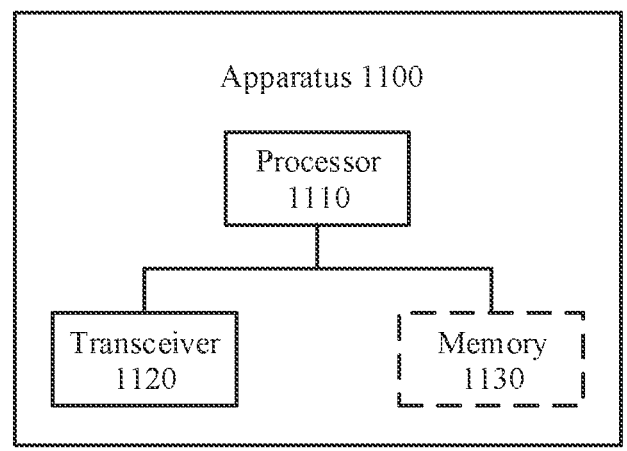
FIG. 11 is a schematic structural diagram of a relay communications apparatus according to another embodiment of this application.

FIG. 11 shows a relay communications apparatus 1100 according to an embodiment of this application. The apparatus 1100 may be the second terminal device in FIG. 4. The apparatus may use a hardware architecture shown in FIG. 11. The apparatus may include a processor 1110 and a transceiver 1120. Optionally, the apparatus may further include a memory 1130. The processor 1110, the transceiver 1120, and the memory 1130 communicate with each other by using an internal connection path. Related functions implemented by the processing module 1010 in FIG. 10 may be implemented by the processor 1110, and related functions implemented by the sending module 1020 may be implemented by the processor 1110 by controlling the transceiver 1120.

Optionally, the processor 1110 may be a general-purpose central processing unit (CPU), a microprocessor, an application-specific integrated circuit (ASIC), a dedicated processor, or one or more integrated circuits configured to perform the technical solutions in the embodiments of this application. Alternatively, the processor may be one or more devices, circuits, and/or processing cores for processing data (for example, computer program instructions). For example, the processor may be a baseband processor or a central processing unit. The baseband processor may be configured to process a communications protocol and communications data, and the central processing unit may be configured to: control a relay communications apparatus (such as a base station, a terminal device, or a chip), execute a software program, and process data of the software program.

Optionally, the processor 1110 may include one or more processors, for example, include one or more central processing units (CPU). When the processor is one CPU, the CPU may be a single-core CPU, or may be a multi-core CPU.

The transceiver 1120 is configured to send a signal and receive a signal. The transceiver may include a transmitter and a receiver. The transmitter is configured to send a signal, and the receiver is configured to receive a signal.

The memory 1130 includes but is not limited to a random access memory (RAM), a read-only memory (ROM), an erasable programmable memory (EPROM), and a compact disc read-only memory (CD-ROM). The memory 1130 is configured to store related instructions and data.

The memory 1130 is configured to store program code and data of a terminal device, and may be a separate device or integrated into the processor 1110.

Specifically, the processor 1110 is configured to control the transceiver to perform information transmission with a radio access network device. For details, refer to the descriptions in the foregoing method embodiments. Details are not described herein again.

During specific implementation, in an embodiment, the apparatus 1100 may further include an output device and an input device. The output device communicates with the processor 1110, and may display information in a plurality of manners. For example, the output device may be a liquid crystal display (LCD), a light emitting diode (LED) display device, a cathode ray tube (CRT) display device, a projector, or the like. The input device communicates with the processor 801, and may receive an input from a user in a plurality of manners. For example, the input device may be a mouse, a keyboard, a touchscreen device, a sensing device, or the like.

It may be understood that FIG. 11 merely shows a simplified design of the relay communications apparatus. During actual application, the apparatus may further include other necessary components, including but not limited to any quantity of transceivers, processors, controllers, memories, and the like, and all terminal devices that can implement this application shall fall within the protection scope of this application.

In a possible design, the apparatus 1100 may be a chip, for example, may be a communications chip that can be used in a terminal device, and configured to implement a related function of the processor 1110 in the terminal device. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, and be configured to store program code. When the code is executed, the processor is enabled to implement a corresponding function.

An embodiment of this application further provides an apparatus. The apparatus may be a terminal device or may be a circuit. The apparatus may be configured to perform an action performed by the terminal device in the foregoing method embodiments.

Figure 12:
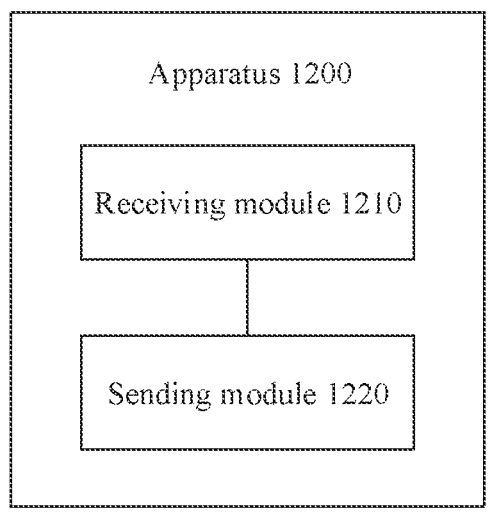
FIG. 12 is a schematic block diagram of a relay communications apparatus according to still another embodiment of this application.

FIG. 12 is a schematic block diagram of a relay communications apparatus 1200 according to an embodiment of this application.

It should be understood that the apparatus 1200 may correspond to the terminal device in the embodiment shown in FIG. 7, and may have any function of the second terminal device in the methods. The apparatus 1200 may include a receiving module 1210 and a sending module 1220.

It should be noted that the apparatus 1200 is used in a communications system including a first terminal device, the apparatus 1200, a third terminal device, and a radio access network device, where the third terminal device is a device that currently provides a relay service for the first terminal device and the radio access network device, and the second terminal device is a device that provides a relay service for the first terminal device and the radio access network device before the third terminal device. The apparatus 1200 includes:

the receiving module 1210, configured to receive data of the first terminal device; and the sending module 1220, further configured to send a first message to the third terminal device, where the first message includes the data of the first terminal device and notification information, the notification information is used to indicate an identifier of the first terminal device, a data radio bearer DRB identifier, and direction indication information, the DRB identifier is used to identify a DRB that carries the data and that is between the first terminal device and the radio access network device, and the direction indication information is used to indicate a transmission direction of the data.

Optionally, the notification information is carried in sidelink control information SCI, and a time domain resource of the SCI is the same as a time domain resource of the data of the first terminal device, or is before the time domain resource of the data of the first terminal device.

Optionally, the notification information is carried in an adaptation layer of the first message.

Figure 13:
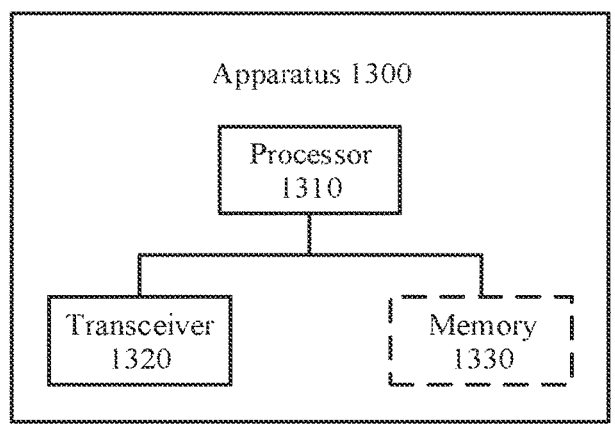
FIG. 13 is a schematic structural diagram of a relay communications apparatus according to still another embodiment of this application.

FIG. 13 shows a relay communications apparatus 1300 according to an embodiment of this application. The apparatus 1300 may be the second terminal device in FIG. 7. The apparatus may use a hardware architecture shown in FIG. 13. The apparatus may include a processor 1310 and a transceiver 1320. Optionally, the apparatus may further include a memory 1330. The processor 1310, the transceiver 1320, and the memory 1330 communicate with each other by using an internal connection path. Required processing-related functions in FIG. 10 may be implemented by the processor 1310, and related functions implemented by the receiving module 1010 and the sending module 1020 may be implemented by the processor 1310 controlling the transceiver 1320.

Optionally, the processor 1310 may be a general-purpose central processing unit, a microprocessor, an application-specific integrated circuit (ASIC), a dedicated processor, or one or more integrated circuits configured to perform the technical solutions in the embodiments of this application. Alternatively, the processor may be one or more devices, circuits, and/or processing cores for processing data (for example, computer program instructions). For example, the processor may be a baseband processor or a central processing unit. The baseband processor may be configured to process a communications protocol and communications data, and the central processing unit may be configured to: control a relay communications apparatus (such as a base station, a terminal device, or a chip), execute a software program, and process data of the software program.

Optionally, the processor 1310 may include one or more processors, for example, include one or more central processing units. When the processor is one CPU, the CPU may be a single-core CPU, or may be a multi-core CPU.

The transceiver 1320 is configured to send a signal and receive a signal. The transceiver 1320 may include a transmitter and a receiver. The transmitter is configured to send a signal, and the receiver is configured to receive a signal.

The memory 1330 includes but is not limited to a RAM, ROM, an EPROM, and a CD-ROM. The memory 1330 is configured to store related instructions and data.

The memory 1330 is configured to store program code and data of a terminal device, and may be a separate device or integrated into the processor 1310.

Specifically, the processor 1310 is configured to control the transceiver to perform information transmission with a radio access network device. For details, refer to the descriptions in the foregoing method embodiments. Details are not described herein again.

During specific implementation, in an embodiment, the apparatus 1300 may further include an output device and an input device. The output device communicates with the processor 1310, and may display information in a plurality of manners. For example, the output device may be a liquid crystal display, a light emitting diode display device, a cathode ray tube display device, a projector, or the like. The input device communicates with the processor 801, and may receive an input from a user in a plurality of manners. For example, the input device may be a mouse, a keyboard, a touchscreen device, a sensing device, or the like.

It may be understood that FIG. 13 merely shows a simplified design of the relay communications apparatus 1300. During actual application, the apparatus 1300 may further include other necessary components, including but not limited to any quantity of transceivers, processors, controllers, memories, and the like, and all terminal devices that can implement this application shall fall within the protection scope of this application.

In a possible design, the apparatus 1300 may be a chip, for example, may be a communications chip that can be used in a terminal device, and configured to implement a related function of the processor 1310 in the terminal device. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, and be configured to store program code. When the code is executed, the processor is enabled to implement a corresponding function.

An embodiment of this application further provides an apparatus. The apparatus may be a terminal device or may be a circuit. The apparatus may be configured to perform an action performed by the terminal device in the foregoing method embodiments.

Figure 14:
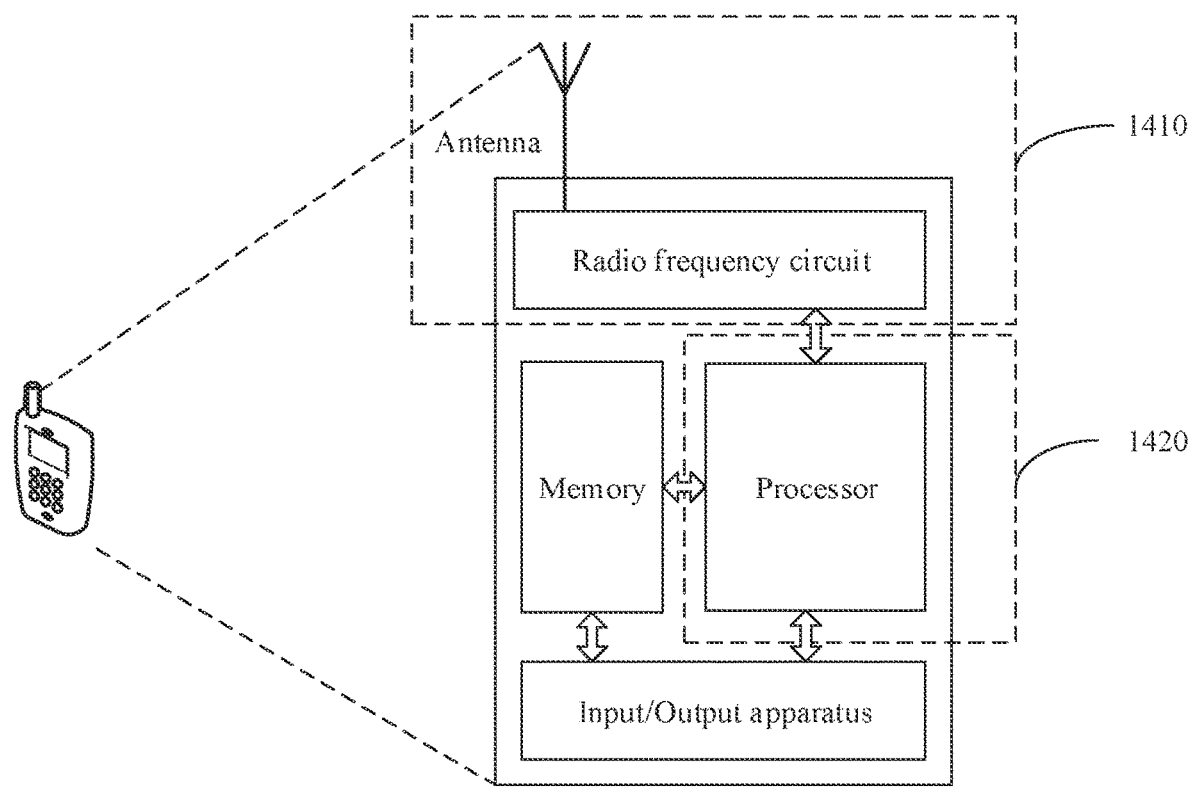
FIG. 14 is a schematic block diagram of a relay communications apparatus according to still another embodiment of this application.

Optionally, when the apparatus in this embodiment is a terminal device, FIG. 14 is a schematic structural diagram of a simplified terminal device. For ease of understanding and illustration, an example in which the terminal device is a mobile phone is used in FIG. 14. As shown in FIG. 14, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus such as a touchscreen, a display, or a keyboard is mainly configured to receive data entered by a user and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends, through the antenna, the radio frequency signal in the form of electromagnetic waves. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 14 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 14, the terminal device includes the transceiver unit 1410 and the processing unit 1420. The transceiver unit 1410 may also be referred to as a transceiver, a receiver/transmitter, a transceiver apparatus, or the like. The processing unit 1420 may also be referred to as a processor, a processing board, a processing module, a processing apparatus, or the like. Optionally, a component that is in the transceiver unit 1410 and that is configured to implement a receiving function may be considered as a receiving unit, and a component that is in the transceiver unit 1410 and that is configured to implement a sending function may be considered as a sending unit. In other words, the transceiver unit 1410 includes the receiving unit and the sending unit. The transceiver unit 1410 may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 1410 is configured to perform a sending operation and a receiving operation on a terminal device side in the foregoing method embodiments, and the processing unit 1420 is configured to perform an operation other than the sending operation and the receiving operation on the terminal device side in the foregoing method embodiments.

For example, in an implementation, the processing unit 1420 is configured to perform processing steps on a terminal device side in the embodiments of this application. The transceiver unit 1410 is configured to perform a sending operation and a receiving operation in step 401 and/or step 402 in FIG. 4, and/or the transceiver unit 1410 is further configured to perform another sending and receiving step on the terminal device side in the embodiments of this application.

When the relay communications apparatus is the chip, the chip includes a transceiver unit and a processing unit. The transceiver unit may be an input/output circuit or a communications interface. The processing unit is a processor, a microprocessor, or an integrated circuit integrated on the chip.

Figure 15:
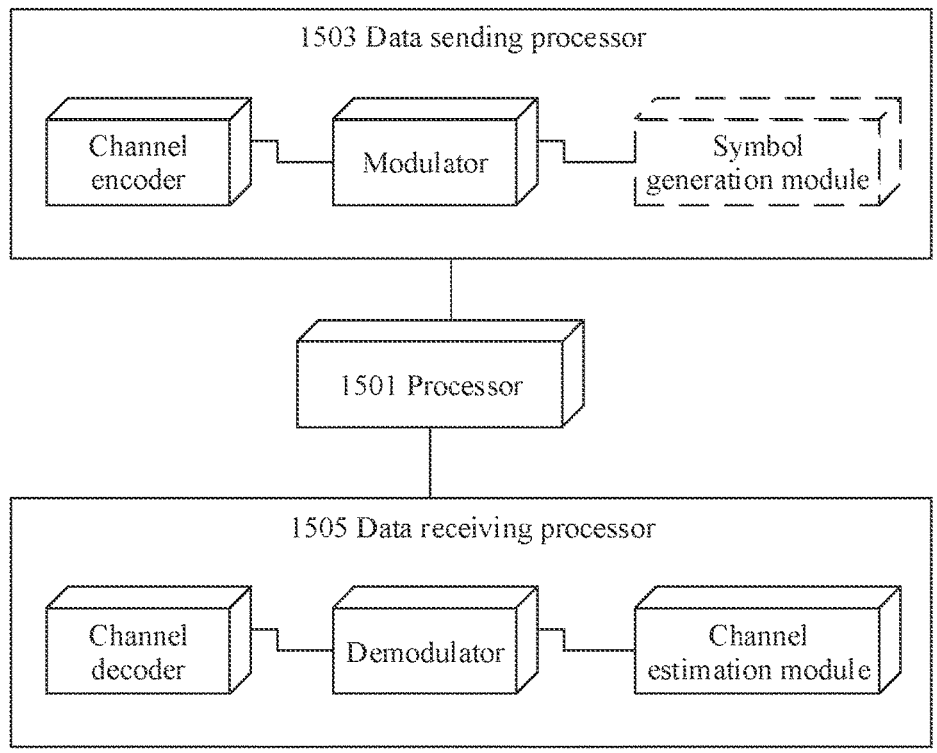
FIG. 15 is a schematic block diagram of a relay communications apparatus according to still another embodiment of this application.

Optionally, when the apparatus is a terminal device, further refer to a device shown in FIG. 15. In an example, the device can implement a function similar to that of the processor 1420 in FIG. 14. In FIG. 15, the device includes a processor 1501, a data sending processor 1503, and a data receiving processor 1505. The processing module 830 in the foregoing embodiment may be the processor 1501 in FIG. 15, and completes a corresponding function. The receiving module 810 and the sending module 820 in the foregoing embodiment may be the data sending processor 1503 and/or the data receiving processor 1505 in FIG. 15. Although FIG. 15 shows a channel encoder and a channel decoder, it may be understood that these modules are merely examples, and do not constitute limitative description of this embodiment.

Figure 16:
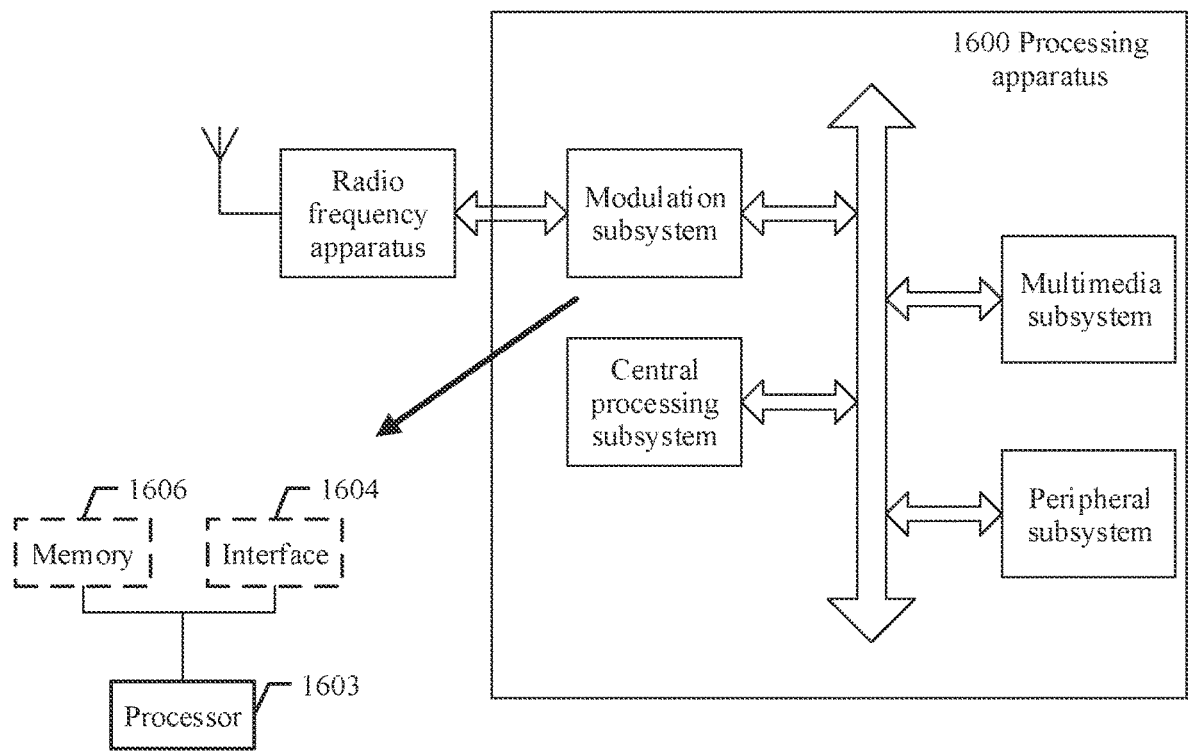
FIG. 16 is a schematic block diagram of a relay communications apparatus according to still another embodiment of this application.

FIG. 16 shows another form of this embodiment. A processing apparatus 1600 includes modules such as a modulation subsystem, a central processing subsystem, and a peripheral subsystem. The communications device in this embodiment may be used as the modulation subsystem in the processing apparatus 1600. Specifically, the modulation subsystem may include a processor 1603 and an interface 1604. The processor 1603 implements a function of the processing module 810, and the interface 1604 implements a function of the transceiver module 820. In another variation, the modulation subsystem includes a memory 1606, a processor 1603, and a program that is stored in the memory and that can be run on the processor. When the program is executed by the processor, the methods in the embodiments shown in FIG. 4, FIG. 6, and FIG. 7 are performed. It should be noted that the memory 1606 may be nonvolatile or volatile. The memory 1606 may be located in the modulation subsystem, or may be located in the processing apparatus 1600, provided that the memory 1606 can be connected to the processor 1603.

In another form of this embodiment, a computer-readable storage medium is provided. The computer-readable storage medium stores instructions. When the instructions are executed, the methods in the foregoing method embodiments are performed.

In another form of this embodiment, a computer program product including instructions is provided. When the instructions are executed, the methods in the foregoing method embodiments are performed.

All or some of the foregoing embodiments may be implemented by software, hardware, firmware, or any combination thereof. When being implemented by using the software, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that, the processor may be an integrated circuit chip, and has a signal processing capability. In an implementation process, the steps in the foregoing method embodiments may be completed by using a hardware integrated logic circuit in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The methods, steps, and logical block diagrams that are disclosed in the embodiments of this application may be implemented or performed. The general-purpose processor may be a microprocessor, or the processor may be any conventional processor or the like. The steps of the method disclosed with reference to the embodiments of this application may be directly performed and completed by using a hardware decoding processor, or may be performed and completed by using a combination of hardware and software modules in a decoding processor. The software module may be located in a mature storage medium in the field, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a non-volatile memory, or may include a volatile memory and a non-volatile memory. The nonvolatile memory may be a ROM, a PROM, an EPROM, an EEPROM, or a flash memory. The volatile memory may be RAM, and is used as an external cache. According to a description that is used as an example instead of a limitation, many forms of RAMs are available, for example, a static random access memory, a dynamic random access memory, a synchronous dynamic random access memory, a double data rate synchronous dynamic random access memory, an enhanced synchronous dynamic random access memory, a synchlink dynamic random access memory, and a direct rambus random access memory.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one item (piece) of the following" or a similar expression thereof represent any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

It should be understood that "one embodiment" or "an embodiment" mentioned in the entire specification does not mean that particular features, structures, or characteristics related to the embodiment are included in at least one embodiment of this application. Therefore, "in one embodiment" or "in an embodiment" throughout the entire specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Terms such as "component", "module", and "system" used in this specification are used to indicate computer-related entities, hardware, firmware, combinations of hardware and software, software, or software being executed. For example, a component may be, but is not limited to, a process that is run on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal with one or more data packets (for example, data from two components interacting with another component in a local system, a distributed system, and/or across a network such as the internet interacting with other systems by using a signal).

It should be further understood that "first", "second", and various numerical symbols in this specification are merely used for distinguishing for ease of description, and are not used to limit a scope of the embodiments of this application.

It should be understood that the term "and/or" in this specification describes only an association relationship between associated objects and indicate that three relationships may exist. For example, A and/or B may indicate the following three cases: Only A exists, both A and B exist, and only B exists. When only A or only B exists, a quantity of A or B is not limited. In an example in which only A exists, it may be understood as that there is one or more A.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

What is claimed is:

1. An apparatus for a second terminal device, comprising:
   at least one processor; and
   at least one memory storing instructions, wherein the instructions, when are executed by the at least one processor, cause the second terminal device to perform operations that comprise:
   generating indication information, wherein the indication information indicates that a radio link failure occurs between the second terminal device and a radio access network device;
   sending to-be-sent data of a first terminal device to a third terminal device, wherein the third terminal device is a device that currently provides a second relay service for the first terminal device and the radio access network device, and wherein the second terminal device is a device that previously provides a first relay service for the first terminal device and the radio access network device; and
   sending the indication information to the first terminal device.

2. The device according to claim 1, wherein the indication information further indicates that signal quality between the second terminal device and the radio access network device is less than a preset threshold.

3. The device according to claim 1, wherein the sending to-be-sent data of a first terminal device to a third terminal device comprises:
   sending a first message, wherein the first message comprises the to-be-sent data, the first message further comprises an identifier of the first terminal device, an identifier of a first path, and uplink indication information or downlink transmission direction indication information that are carried when the to-be-sent data is sent to the third terminal device, and the first path is used for communication between the first terminal device and the radio access network device.

4. A method for a second terminal device, comprising:
generating indication information, wherein the indication information indicates that a radio link failure occurs between the second terminal device and a radio access network device;
sending to-be-sent data of a first terminal device to a third terminal device, wherein the third terminal device is a device that currently provides a second relay service for the first terminal device and the radio access network device, and wherein the second terminal device is a device that previously provides a first relay service for the first terminal device and the radio access network device; and
sending the indication information to the first terminal device.

5. The method according to claim 4, wherein the indication information further indicates that signal quality between the second terminal device and the radio access network device is less than a preset threshold.

6. The method according to claim 4, wherein the sending to-be-sent data of a first terminal device to a third terminal device comprises:
sending a first message, wherein the first message comprises the to-be-sent data, the first message further comprises an identifier of the first terminal device, an identifier of a first path, and uplink indication information or downlink transmission direction indication information that are carried when the to-be-sent data is sent to the third terminal device, and the first path is used for communication between the first terminal device and the radio access network device.

* * * * *